United States Patent
Min et al.

(10) Patent No.: US 9,294,781 B2
(45) Date of Patent: *Mar. 22, 2016

(54) METHOD AND APPARATUS FOR ENCODING VIDEO BY USING TRANSFORMATION INDEX, AND METHOD AND APPARATUS FOR DECODING VIDEO BY USING TRANSFORMATION INDEX

(71) Applicant: SAMSUNG ELECTRONICS CO., LTD., Suwon-si (KR)

(72) Inventors: Jung-hye Min, Suwon-si (KR); Woo-jin Han, Suwon-si (KR); Tammy Lee, Seoul (KR); Il-koo Kim, Osan-si (KR); Min-su Cheon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/696,959

(22) Filed: Apr. 27, 2015

(65) Prior Publication Data

US 2015/0229968 A1    Aug. 13, 2015

Related U.S. Application Data

(63) Continuation of application No. 14/611,630, filed on Feb. 2, 2015, now Pat. No. 9,049,460, which is a continuation of application No. 13/079,983, filed on Apr. 5, 2011, now Pat. No. 8,982,961.

(60) Provisional application No. 61/320,826, filed on Apr. 5, 2010.

(30) Foreign Application Priority Data

Oct. 5, 2010  (KR) .................. 10-2010-0096920

(51) Int. Cl.
*H04N 19/00* (2014.01)
*H04N 19/60* (2014.01)
(Continued)

(52) U.S. Cl.
CPC ............. *H04N 19/60* (2014.11); *H04N 19/122* (2014.11); *H04N 19/172* (2014.11);
(Continued)

(58) Field of Classification Search
CPC ...................................................... H04N 19/00
USPC ........................................ 375/240.18, 240.25
See application file for complete search history.

(56) References Cited

U.S. PATENT DOCUMENTS

| | | |
|---|---|---|
| 5,367,629 A | 11/1994 | Chu et al. |
| 6,195,465 B1 | 2/2001 | Zandi et al. |

(Continued)

FOREIGN PATENT DOCUMENTS

| | | |
|---|---|---|
| CN | 1698386 A | 11/2005 |
| CN | 1835595 A | 9/2006 |

(Continued)

OTHER PUBLICATIONS

International Search Report dated Dec. 15, 2011 in counterpart international application No. PCT/KR2011/002386.

(Continued)

*Primary Examiner* — Sath V Perungavoor
*Assistant Examiner* — Jeffery Williams
(74) *Attorney, Agent, or Firm* — Sughrue Mion, PLLC

(57) ABSTRACT

Encoding and decoding a video using transformation index that indicates information that indicates a structure of a transformation unit transforming data of a current coding unit.

4 Claims, 17 Drawing Sheets

(51) Int. Cl.

| | | |
|---|---|---|
| *H04N 19/46* | (2014.01) | |
| *H04N 19/122* | (2014.01) | |
| *H04N 19/96* | (2014.01) | |
| *H04N 19/44* | (2014.01) | |
| *H04N 19/635* | (2014.01) | |
| *H04N 19/172* | (2014.01) | |
| *H04N 19/176* | (2014.01) | |

(52) U.S. Cl.
CPC ............ *H04N 19/176* (2014.11); *H04N 19/44* (2014.11); *H04N 19/46* (2014.11); *H04N 19/635* (2014.11); *H04N 19/96* (2014.11)

(56) References Cited

U.S. PATENT DOCUMENTS

| | | | |
|---|---|---|---|
| 7,181,072 | B2 | 2/2007 | Wang et al. |
| 7,262,721 | B2 | 8/2007 | Jeon et al. |
| 7,460,041 | B2 | 12/2008 | Yang et al. |
| 7,577,305 | B2 | 8/2009 | Srinivasan |
| 7,792,193 | B2 | 9/2010 | Tanizawa et al. |
| 8,398,806 | B2 | 3/2013 | Yokouchi et al. |
| 2003/0016745 | A1 | 1/2003 | Park et al. |
| 2003/0128753 | A1 | 7/2003 | Lee et al. |
| 2003/0215014 | A1 | 11/2003 | Koto et al. |
| 2005/0008231 | A1 | 1/2005 | Christopoulos et al. |
| 2005/0041740 | A1 | 2/2005 | Sekiguchi et al. |
| 2005/0084013 | A1 | 4/2005 | Wang et al. |
| 2005/0114093 | A1* | 5/2005 | Cha et al. ................. 702/189 |
| 2005/0123207 | A1 | 6/2005 | Marpe et al. |
| 2005/0147169 | A1 | 7/2005 | Wang et al. |
| 2005/0244068 | A1 | 11/2005 | Nakachi et al. |
| 2006/0146936 | A1 | 7/2006 | Srinivasan |
| 2006/0251330 | A1 | 11/2006 | Toth et al. |
| 2006/0262978 | A1 | 11/2006 | Wang et al. |
| 2007/0009047 | A1 | 1/2007 | Shim et al. |
| 2007/0098078 | A1 | 5/2007 | Kim et al. |
| 2007/0248163 | A1 | 10/2007 | Zuo et al. |
| 2008/0055614 | A1 | 3/2008 | Qiao et al. |
| 2008/0069235 | A1 | 3/2008 | Abe et al. |
| 2008/0170793 | A1 | 7/2008 | Yamada et al. |
| 2008/0232706 | A1 | 9/2008 | Lee et al. |
| 2008/0310745 | A1 | 12/2008 | Ye et al. |
| 2009/0003716 | A1 | 1/2009 | Sekiguchi et al. |
| 2009/0080534 | A1 | 3/2009 | Sekiguchi et al. |
| 2009/0087110 | A1 | 4/2009 | Tourapis et al. |
| 2009/0232207 | A1 | 9/2009 | Chen |
| 2009/0245668 | A1 | 10/2009 | Fukuhara et al. |
| 2010/0040148 | A1 | 2/2010 | Marpe et al. |
| 2011/0090967 | A1* | 4/2011 | Chen et al. ............... 375/240.16 |
| 2013/0343452 | A1 | 12/2013 | Jeong et al. |

FOREIGN PATENT DOCUMENTS

| | | | |
|---|---|---|---|
| CN | 101835595 | A | 9/2010 |
| EP | 2608539 | A2 | 6/2013 |
| EP | 2713618 | B1 | 3/2015 |
| JP | 5506340 | A | 9/1993 |
| JP | 08-251590 | A | 9/1996 |
| JP | 11-164305 | A | 6/1999 |
| JP | 2001-145106 | A | 5/2001 |
| JP | 2003179499 | A | 6/2003 |
| JP | 2003-230149 | A | 8/2003 |
| JP | 2005513883 | A | 5/2005 |
| JP | 2006-211304 | A | 8/2006 |
| JP | 2007-174569 | A | 7/2007 |
| JP | 2008527902 | A | 7/2008 |
| JP | 2009504039 | A | 1/2009 |
| JP | 2011526770 | A | 10/2011 |
| KR | 20030009669 | A | 2/2003 |
| KR | 1020040105872 | A | 12/2004 |
| KR | 1020050045746 | A | 5/2005 |
| KR | 1020050061396 | A | 6/2005 |
| KR | 1020060027795 | A | 3/2006 |
| KR | 1020070047523 | A | 5/2007 |
| KR | 100842558 | B1 | 6/2008 |
| RU | 2 273 112 | C2 | 3/2006 |
| RU | 2 334 973 | C1 | 9/2008 |
| RU | 2 335 845 | C2 | 10/2008 |
| WO | 2004/084123 | A1 | 9/2004 |
| WO | 2008/020672 | A1 | 2/2008 |
| WO | 2010002214 | A2 | 1/2010 |
| WO | 2011/126277 | A3 | 10/2011 |
| WO | 2011/126282 | A3 | 10/2011 |

OTHER PUBLICATIONS

International Search Report dated Dec. 19, 2011 in counterpart international application No. PCT/KR2011/002389.
International Search Report dated Dec. 22, 2011 in counterpart international application No. PCT/KR2011/002383.
International Search Report dated Nov. 23, 2011 in counterpart international application No. PCT/KR2011/002384.
International Search Report dated Nov. 28, 2011 in counterpart international application No. PCT/KR2011/002377.
Notification of Transmittal of the International Search Report and the Written Opinion of the International Searching Authority dated Dec. 15, 2011 in counterpart international application No. PCT/KR2011/002386.
Notification of Transmittal of the International Search Report and the Written Opinion of the International Searching Authority dated Dec. 19, 2011 in counterpart international application No. PCT/KR2011/002389.
Notification of Transmittal of the International Search Report and the Written Opinion of the International Searching Authority dated Dec. 22, 2011 in counterpart international application No. PCT/KR2011/002383.
Notification of Transmittal of the International Search Report and the Written Opinion of the International Searching Authority dated Nov. 23, 2011 in counterpart international application No. PCT/KR2011/002384.
Notification of Transmittal of the International Search Report and the Written Opinion of the International Searching Authority dated Nov. 28, 2011 in counterpart international application No. PCT/KR2011/002377.
Written Opinion of the International Searching Authority dated Dec. 15, 2011 in counterpart international application No. PCT/KR2011/002386.
Written Opinion of the International Searching Authority dated Dec. 19, 2011 in counterpart international application No. PCT/KR2011/002389.
Written Opinion of the International Searching Authority dated Dec. 22, 2011 in counterpart international application No. PCT/KR2011/002383.
Written Opinion of the International Searching Authority dated Nov. 23, 2011 in counterpart international application No. PCT/KR2011/002384.
Written Opinion of the International Searching Authority dated Nov. 28, 2011 in counterpart international application No. PCT/KR2011/002377.
Communication, dated Sep. 3, 2013, issued by the Australian Patent Office in counterpart Australian Application No. 2011239059.
Communication, dated Sep. 3, 2013, issued by the Australian Patent Office in counterpart Australian Application No. 2011239137.
Communication dated Dec. 9, 2013 issued by the Russian Patent Office in counterpart Russian Patent Application No. 2012146753.
Communication dated Jan. 22, 2014 issued by the Russian Patent Office in counterpart Russian Patent Application No. 2012146749.
Communication from the Malaysian Patent Office issued May 15, 2014 in a counterpart Malaysian Application No. PI 2012004422.
Communication from the Malaysian Patent Office issued May 15, 2014 in a counterpart Malaysian Application No. PI 2012004418.
Communication from the Australian Patent Office issued Sep. 22, 2014 in a counterpart Australian Application No. 2011239059.
Communication from the Russian Patent Office dated Jul. 28, 2014, in a counterpart Russian application No. 2012146749/08(075112).

(56) References Cited

OTHER PUBLICATIONS

Woo-Jin Han, et al., "Improved Video Compression Efficiency Through Flexible Unit Representation and Corresponding Extension of Coding Tools", IEEE Trans. on CSVT. Dec 2010, vol. 20, No. 12, pp. 1709-1720.
S. Naito, et al., "Efficient coding scheme for super high definition video based on extending H.264 high profile", Visual Communications and Image Processing 2007. Jan. 2006, SPIE-IS&T/vol. 6077, pp. 1-8.
Siwei Ma, et al., "High-definition Video Coding with Super-macroblocks", Visual Communications and Image Processing 2007. Jan. 2007, SPIE-IS&T/vol. 6508, pp. 1-12.
Ken McCann, et al. "Samsung's Response to the Call for Proposals on Video Compression Technology", JCT-VC of ITU-T SG16 WP3 and ISO/IEC JTC1/SC29/WG11, 1st Meeting. JCTVC-A124. Apr. 15-23, 2010, pp. 1-42.
Communication from the Korean Intellectual Property Office dated Dec. 11, 2014, in a counterpart Korean application No. 10-2010-0096920.
Communication from the Canadian Patent Office issued Oct. 17, 2014, in a counterpart Canadian Application No. 2795621.
Nakano, et al.; "A Method of Stream Base Fast Image Retrieval for JPEG Coded Images", ITB Technical Report, Feb. 2005, vol. 29, No. 17, 8 pages total.
Yu, et al.; "Low Bit Rate Video Coding Using Variable Block Size Model", Proceedings of 1990 International Conference on Acoustics, Speech, and Signal Processing, Apr. 1990, vol. 4, 8 pages total.
Martin, et al.; "Reduced Entropy Motion Compensation Using Variable Sized Blocks", Proceedings of SPIE—The International Society for Optical Engineering, Jan. 1997, vol. 3024, 11 pages total.
Chen, "Adaptive Transform Coding Via Quadtree-Based Variable Blocksize DCT", Proceedings of 1989 International Conference on Acoustics, Speech, and Signal Processing, May 1989, vol. 3, 8 pages total.
Yamamoto, et al.; "Further Result on Constraining Transform Candidate in Extended Block Sizes", ITU—Telecommunications Standardization Sector Study Group 16 Question 6 Video Coding Experts Group (VCEG), Jul. 2009, 8 pages total.
Communication dated Feb. 28, 2015, issued by the State Intellectual Property Office of the People's Republic of China in counterpart Chinese Application No. 201180027746.6.
Communication dated Mar. 23, 2015, issued by the State Intellectual Property Office of the People's Republic of China in counterpart Chinese Application No. 201180027751.7.
Communication dated Feb. 3, 2015, issued by the Japanese Patent Office in counterpart Japanese Application No. 2013-503673.
Communication dated Feb. 3, 2015, issued by the Japanese Patent Office in counterpart Japanese Application No. 2013-503671.
Communication dated Feb. 2, 2015, issued by the Directorate General of Intellectual Property Rights of Indonesia in counterpart Indonesian Application No. W-00201204527.
Communication dated May 5, 2015, issued by the State Intellectual Property Office of P.R. China in counterpart Chinese Application No. 201180027747.0.
Communication dated May 7, 2015, issued by the European Patent Office in counterpart European Application No. 11766128.0.
Communication dated Jul. 21, 2015, issued by the Japanese Intellectual Property Office in counterpart Japanese Application No. 2013-503671.
Communication dated Jul. 21, 2015, issued by the Japanese Intellectual Property Office in counterpart Japanese Application No. 2015-095272.
Communication dated Jul. 21, 2015, issued by the Japanese Intellectual Property Office in counterpart Japanese Application No. 2015-095273.
Communication dated Jul. 21, 2015, issued by the Japanese Intellectual Property Office in counterpart Japanese Application No. 2015-095274.
Communication dated Jul. 21, 2015, issued by the Japanese Intellectual Property Office in counterpart Japanese Application No. 2015-095275.
D. Marpe et al., "Context-based adaptive binary arithmetic coding in the H.264/AVC video compression standard", IEEE Transactions on Circuits and Systems for Video Technology, vol. 13, No. 7, Jul. 1, 2003, pp. 620-636, XP5512007.
Wiegand; "Editors proposed Modifications to Joint Committee Draft (CD) of Joint Video Specification (ITU-T Rec. H.264 | ISO/IEC 14496-10 AVC) relative to JVT-D015d", 4. JVT Meeting; 61. MPEG Meeting; Jul. 22, 2002-Jul. 26, 2002; Klagenfurt,AT; (Joint Video Team of ISO/IEC JTC1/SC29/WG11 and ITU-T SG.16),, No. JVT-D017d2, Jul. 26, 2002, Total 154 pages, XP030005292.
Naito, S., et.al., "Efficient coding scheme for super high definition video based on extending H.264 high profile", Proc. of SPIE-IS&T Electronic Imaging, SPIE vol. 6077, Jan. 2006, pp. 6077227-1-607727-8.
Wiegand; "Editors proposed revision of CD relative to JVT-D015d", 4. JVT Meeting; 61. MPEG Meeting; Jul. 22, 2002-Jul. 26, 2002; Klagenfurt,AT; (Joint Video Team of ISO/IEC JTC1/SC29/WG11 and ITU-T SG.16),, No. JVT-D017d2, Jul. 26, 2002, Total 154 pages, XP030005292.
Naito, S., et.al., "Efficient coding scheme for super high definition video based on extending H.264 high profile", Proc. of SPIE-IS&T Electronic Imaging, SPIE vol. 6077, Jan. 2006, pp. 607727-1-607727-8.
Communication dated Aug. 25, 2015 issued by Korean Intellectual Property Office in counterpart Korean Patent Application No. 10-2014-0148760.
Communication dated Aug. 25, 2015 issued by Korean Intellectual Property Office in counterpart Korean Patent Application No. 10-2015-0095376.
Communication dated Aug. 25, 2015 issued by Korean Intellectual Property Office in counterpart Korean Patent Application No. 10-2015-0095377.
Anonymous, "Test Model under Consideration", Joint Collaborative Team on Video Coding (JCT-VC) of ITU-T SG16 WP3 and ISO/IEC JTC1/SC29/WG11, 2nd Meeting, Jul. 21-28, 2010, 152 pages total, JCT-VC, Geneva, CH, Document JCTVC-B205.

\* cited by examiner

TRANSFORMATION INDEX=1, 0, 0, 1, 0, 1, 0, 0, 0

TRANSFORMATION INDEX = 1

TRANSFORMATION INDEX = 1 0 0 0 0

CODING UNITS (1010)

METHOD AND APPARATUS FOR ENCODING VIDEO BY USING TRANSFORMATION INDEX, AND METHOD AND APPARATUS FOR DECODING VIDEO BY USING TRANSFORMATION INDEX

CROSS-REFERENCE TO RELATED PATENT APPLICATION

This application is a Continuation application of U.S. patent application Ser. No. 14/611,630, filed on Feb. 2, 2015, which is a Continuation application of U.S. patent application Ser. No. 13/079,983, filed on Apr. 5, 2011, in the U.S. Patent and Trademark Office, now U.S. Pat. No. 8,982,961, which claims the benefit of U.S. Provisional Patent Application No. 61/320,826, filed on Apr. 5, 2010, in the U.S. Patent and Trademark Office, and priority from Korean Patent Application No. 10-2010-0096920, filed on Oct. 5, 2010, in the Korean Intellectual Property Office, the disclosures of which are incorporated herein by reference in their entireties.

BACKGROUND

1. Field

The exemplary embodiments relate to video encoding and video decoding in which transformation between a spatial domain and a transformation domain is performed.

2. Description of the Related Art

As hardware for reproducing and storing high resolution or high quality video content is being developed and supplied, a need for a video codec for effectively encoding or decoding the high resolution or high quality video content is increasing. In a conventional video codec, a video is encoded according to a limited encoding method based on a macroblock having a predetermined size. In the conventional video codec, video data is encoded and decoded by performing transformation and inverse transformation on macroblocks by using blocks each having the same size.

SUMMARY

According to an aspect of an exemplary embodiment, there is provided a method of encoding a video including: determining a transformation unit that is a data unit in which a current coding unit is transformed, the coding unit being a data unit in which a current picture of the video is encoded; transforming data of the current coding unit based on the determined transformation unit to encode the data of the current coding unit; and outputting the encoded data of the current coding unit, encoding mode information that indicates an encoding mode of the encoded data of the current coding unit, and transformation index information that indicates a structure of the transformation unit transforming the data of the current coding unit, as a bitstream.

According to another aspect of an exemplary embodiment, there is provided a method of decoding an encoded video including: receiving a bitstream of the encoded video and parsing the received bitstream; extracting encoded data of a current coding unit that is a data unit in which a current picture of the encoded video is encoded, encoding mode information that indicates an encoding mode of the encoded data of the current coding unit, and transformation index information that indicates a structure of a transformation unit that is a data unit in which the data of the current coding unit is transformed, from the parsed bitstream; and performing inverse transformation on the encoded data of the current coding unit based on the transformation index information to decode the encoded data of the current coding unit transformed in the transformation unit.

According to another aspect of an exemplary embodiment, there is provided a video encoding apparatus including a processor, the apparatus including: a transformation unit determiner which determines a transformation unit that is a data unit in which a current coding unit is transformed, the coding unit being a data unit in which a current picture of a received video is encoded; an encoding unit which transforms data of the current coding unit based on the determined transformation unit to encode the data of the current coding unit; and an encoded data output unit which outputs the encoded data of the current coding unit, encoding mode information that indicates an encoding mode of the encoded data of the current coding unit, and transformation index information that indicates a structure of the transformation unit transforming the data of the current coding unit.

According to another aspect of an exemplary embodiment, there is provided a video decoding apparatus including a processor, the apparatus including: a receiver which receives a bitstream of an encoded video and parses the received bitstream; an extractor which extracts encoded data of a current coding unit that is a data unit in which a current picture of the encoded video is encoded, encoding mode information that indicates an encoding mode of the encoded data of the current coding unit, and transformation index information that indicates a structure of a transformation unit that is a data unit in which the current coding unit is transformed, from the parsed bitstream; and a decoder which performs inverse transformation on the encoded data of the current coding unit based on the transformation index information to decode the encoded data of the current coding unit transformed in the transformation unit.

According to another aspect of an exemplary embodiment, there is provided a video encoding apparatus including a processor, the apparatus including: a maximum coding unit splitter which splits a current picture into at least one maximum coding unit; a coding unit determiner which determines coding units having a tree structure that include coding units of a coded depth that are hierarchical according to depths in a same region of the at least one maximum coding unit and independent in different regions, by independently determining a coding unit of a coded depth to output an encoding result for each deeper coding unit, from among all deeper coding units hierarchically constructed according to depths that indicate numbers of times the at least one maximum coding unit is spatially split, for each of the at least one maximum coding unit, and determining a transformation unit being a data unit in which a current coding unit from among the coding units having the tree structure is transformed, to encode the current coding unit by including transformation based on the transformation unit; and an output unit which encodes and outputs encoded data of the current picture, information about a coded depth of the coding units having the tree structure and an encoding mode, and transformation index information about a structure of transformation units of the coding units of the coded depth, for each of the maximum coding units.

According to another aspect of an exemplary embodiment, there is provided a video decoding apparatus including a processor, the apparatus including: a receiver which receives a bitstream of an encoded video and parses the received bitstream; an image data and encoded information extractor which extracts encoded data of a picture, information about a coded depth and an encoding mode, and transformation index information about a structure of transformation units of the coding units of the coded depth, according to coding units having a tree structure included in each of a plurality of maximum coding units into which the picture is split, from the parsed bitstream; and an image data decoder that decodes the encoded data by performing inverse transformation on the coding units of the coded depth, based on transformation units obtained based on the transformation index information, for each of the plurality of maximum coding units, wherein the coding units having the tree structure comprise coding units corresponding to a coded depth determined to output an encoding result from among deeper coding units hierarchically constructed according to depths that indicate numbers of times the maximum coding unit is spatially split, when at least one of the plurality of maximum coding units is encoded.

According to another aspect of an exemplary embodiment, there is provided a computer readable recording medium having recorded thereon a program for executing the method of encoding a video.

According to another aspect of an exemplary embodiment, there is provided a computer readable recording medium having recorded thereon a program for executing the method of decoding a video.

BRIEF DESCRIPTION OF THE DRAWINGS

The above and/or other aspects will become more apparent by describing in detail exemplary embodiments thereof with reference to the attached drawings in which.

DETAILED DESCRIPTION OF EXEMPLARY EMBODIMENTS

Hereinafter, the exemplary embodiments will be described more fully with reference to the accompanying drawings, in which THE exemplary embodiments are shown. In the exemplary embodiments, "unit" may or may not refer to a unit of size, depending on its context, and an 'image' may denote a still image for a video or a moving image, that is, the video itself.

Hereinafter, a 'coding unit' is an encoding data unit in which the image data is encoded at an encoder side and an encoded data unit in which the encoded image data is decoded at a decoder side, according to exemplary embodiments. Also, a 'coded depth' indicates a depth where a coding unit is encoded.

Encoding and decoding of a video by using a transformation index on the basis of transformation units having a tree structure, according to an exemplary embodiment, will be described with reference to FIGS. 1 through 8. Encoding and decoding of a video by using a transformation index on the basis of coding units and transformation units having a tree structure, according to an exemplary embodiment, be described with reference to FIGS. 9 through 23.

First, a method and apparatus for encoding video by using a transformation index and a method and apparatus for decoding video by using a transformation index according to an exemplary embodiment will be described with reference to FIGS. 1 to 8.

Figure 1:
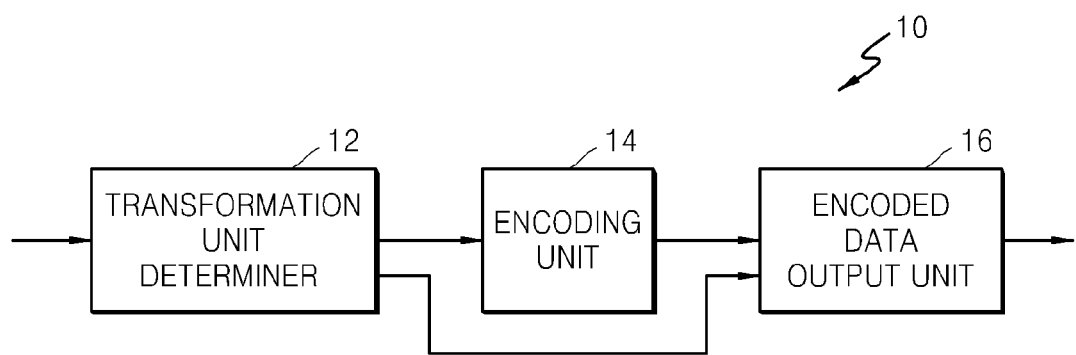
FIG. 1 is a block diagram of a video encoding apparatus using a transformation index, according to an exemplary embodiment.

FIG. 1 is a block diagram of a video encoding apparatus 10 using a transformation index, according to an exemplary embodiment.

Referring to FIG. 1, the video encoding apparatus 10 using a transformation index includes a transformation unit determiner 12, an encoding unit 14, and an encoded data output unit 16. For convenience of explanation, the video encoding apparatus using a transformation index will be referred to as a video encoding apparatus 10. The operations of the transformation unit determiner 12, the encoding unit 14, and the encoded data output unit 16 of the video encoding apparatus 10 may be organically controlled by a (not shown) video encoding processor, a central processing unit (CPU), a graphics processing unit (GPU), or the like.

The video encoding apparatus 10 splits a current picture of a received video into data units, each unit having a predetermined size, and performs encoding on each of the data units, to encode the current picture. Hereinafter, a data unit in which the current picture is encoded is referred to as a 'coding unit'. The video encoding apparatus 10 may encode the current picture by performing predictive encoding including inter-prediction and intra-prediction, transformation and quantization, and entropy encoding on each coding unit.

The transformation unit determiner 12 determines a transformation unit, that is, a data unit in which a current coding unit, from among the coding units of the current picture, is transformed. The transformation unit may be included in the current coding unit, and may be determined to be a data unit having a size smaller than or equal to the current coding unit. The transformation unit determiner 12 may generate the transformation unit by halving the height and width of the current coding unit, i.e., quartering the current coding unit.

The transformation unit determiner 12 may generate transformation units of a lower level by halving the height and width of the transformation unit. The transformation unit determiner 12 may split the current coding unit into transformation units each having the same size by splitting all transformation units into transformation units of a lower level. Since the height and width of each transformation unit are halved, the current coding unit may be split into transformation units each having the same size, and the total number of transformation units of a lower level is 4 to the power of a positive integer.

The transformation unit determiner 12 may determine transformation units having a tree structure, to transform the current coding unit. The transformation units having a tree structure include final transformation units whose transformation results are determined to be output, from among the transformation units of the current coding unit.

In order to determine the transformation units having a tree structure, the transformation unit determiner 12 may generate transformation units of a lower level by repeatedly halving the height and width of a transformation unit from among the transformation units of the current coding unit. The transformation unit determiner 12 may determine whether to split each transformation unit into transformation units of lower level, independently from the other transformation units on the same level as that of the each transformation unit.

The transformation unit determiner 12 may select transformation units of a level where a transformation error is minimized, by repeatedly transforming transformation units of each of all levels having a hierarchical structure in the current coding unit. The transformation unit of the level allowing for a minimum transformation error may be determined to be a final transformation unit whose transformation result is to be output. Accordingly, the transformation unit determiner 12 may determine transformation units having a tree structure according to an exemplary embodiment in which the final transformation units whose transformation results are determined to be output are included.

The encoding unit 14 encodes the current coding unit by generating residual data of the current coding unit and transforming the residual data based on the transformation units determined by the transformation unit determiner 12. 'Transformation' for video encoding according to an exemplary embodiment denotes a data processing technique for transforming the data of a spatial domain of a video into the data of a transformation domain thereof. Examples of the transformation performed for video encoding by the encoding unit 14 may include frequency transformation, orthogonal transformation, integer transformation, and the like.

The encoded data output unit 16 outputs encoded data of the current coding unit, information that indicates an encoding mode, and transformation index information, as a bitstream.

The information about an encoding mode may include information about various methods and the like used to encode the current coding unit.

The transformation index information may be information about the structure of a transformation unit used to transform the current coding unit. For example, the transformation index information may include the number of times the current coding unit is split to turn into transformation units of a final level, and information about the sizes and shapes of the transformation units.

The transformation index information may represent whether a current transformation unit is split into transformation units of a lower level. For example, a transformation unit split bit corresponding to 1-bit data, that indicates whether a current transformation unit is split into transformation units of a lower level, may be used as the transformation index information.

Transformation index information according to a first exemplary embodiment may indicate whether the current transformation unit is split into transformation units each having the same size. For example, the transformation index information according to the first exemplary embodiment may indicate whether the height and width of the current coding unit are each halved once to obtain four transformation units or are each halved twice to obtain 16 transformation units. In other words, the transformation index information according to the first exemplary embodiment may represent the number of 4 to the power of a positive integer of the transformation units each having the same size, into which the current coding unit is split.

Transformation index information according to a second exemplary embodiment may indicate whether the current coding unit is split into transformation units having various sizes according to a tree structure, according to an exemplary embodiment.

The size of a transformation unit may be determined based on the transformation index and a prediction unit type or a partition type of a current coding unit. For example, the size of a transformation unit corresponding to the transformation index may vary according to a prediction unit type or a partition type of a coding unit.

If the current transformation unit is split into transformation units each having the same size, the current size of the transformation unit may be determined based on the transformation index and a prediction unit type or a partition type of a corresponding coding unit. Also, if a current coding unit is split into transformation units having various sizes according to a tree structure, the size of a current transformation unit may be determined based on the transformation index and a prediction unit type or a partition type of the current coding unit.

According to an exemplary embodiment, the maximum size of a transformation unit may be equal to the size of a current coding unit. According to other exemplary embodiment, the maximum size of a transformation unit may be determined base on a prediction unit type or a partition type of a current prediction unit or partition. For example, the maximum size of the current transformation unit size may indicate the size of a maximum square included in the current prediction unit or partition.

For example, the transformation index information according to the second exemplary embodiment may be represented as a bitstring obtained by arranging transformation unit split bits of transformation units of respective levels that are obtained until the current coding unit is split into transformation units having the tree structure. The transformation index information according to the second exemplary embodiment may include a bitstring obtained by arranging transformation unit split bits of adjacent transformation units of the same level in a sequence where the transformation units are scanned in a zigzag manner. When a predetermined transformation unit may be split into transformation units of a lower level having a hierarchical structure, the transformation index information according to the second exemplary embodiment may include a bitstring obtained by arranging transformation unit split bits of the transformation units of the lower level in a sequence where the transformation units are scanned in a zigzag manner.

Figure 2:
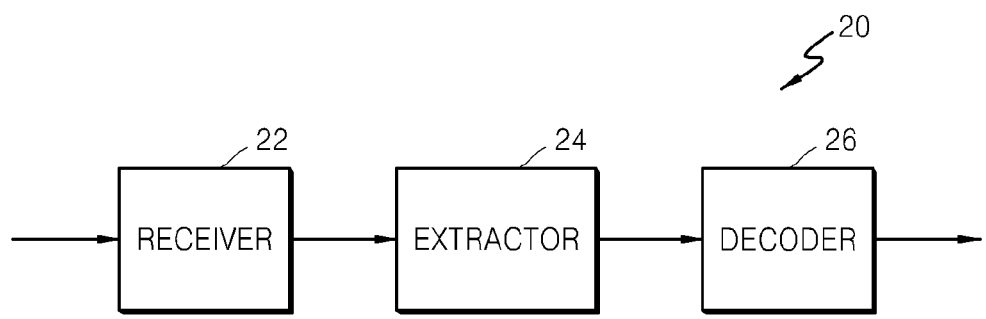
FIG. 2 is a block diagram of a video decoding apparatus using a transformation index, according to an exemplary embodiment.

FIG. 2 is a block diagram of a video decoding apparatus using a transformation index, according to an exemplary embodiment Referring to FIG. 2, the video decoding apparatus 20 using a transformation index includes a receiver 22, an extractor 24, and a decoder 26. For convenience of explanation, the video decoding apparatus 20 using a transformation index will be referred to as a video decoding apparatus 20. The operations of the receiver 22, the extractor 24, and the decoder 26 of the video decoding apparatus 20 may be controlled by a (not shown) video decoding processor, a CPU, a GPU, or the like.

To decode a current picture of a received video, the video decoding apparatus 20 may decode the current picture by performing entropy decoding, dequantization, inverse transformation, and predictive decoding, including inter-prediction/compensation and intra-prediction/compensation, on each coding unit of the current picture.

The receiver 22 receives and parses a bitstream for an encoded video. The extractor 24 extracts encoded data of each coding unit of the current picture, information about an encoding mode, and transformation index information of a current coding unit, from the bitstream parsed by the receiver 22.

The decoder 26 decodes the encoded data by generating transformation units of the current coding unit according to the transformation index information extracted by the extractor 24 and performing inverse transformation on the current coding unit on the basis of the transformation units. As a result of the decoding of coding units, the current picture may be restored.

The concept of the transformation unit is similar to that described above with reference to the video encoding apparatus 10 of FIG. 1. In other words, a transformation unit according to an exemplary embodiment may be a transformation unit obtained by halving the height and width of the current coding unit or a transformation unit of an upper level. All of the transformation units included in the current coding unit according to an exemplary embodiment may have the same size. A transformation unit according to another exemplary embodiment is a transformation unit of one level from among the transformation units of the current coding unit that have a tree structure, and may be split into transformation units of a lower level through repetitive splitting for each level of transformation unit or into transformation units of a lower level through independent splitting between adjacent transformation units.

The decoder 26 may read information that indicates the number of times the current coding unit is split to turn into transformation units of a final level, information about the sizes and shapes of the transformation units, and the like, from the transformation index information.

The decoder 26 may read information that indicates whether a current transformation unit is split into transformation units of a lower level, from the transformation index information.

The decoder 26 may read information that indicates the level of a transformation unit from a transformation index according to a first exemplary embodiment. In this case, since the current coding unit is split into transformation units of the same sizes for each level until transformation units of a final level are obtained, the decoder 26 may determine the transformation units of the final level having the same size by determining the final level of transformation units according to the transformation index and halving the heights and widths of all of the transformation units of an upper level when the current coding unit is split into the transformation units of the final level.

The decoder 26 may determine the size of a transformation unit based on the transformation index and a prediction unit type or a partition type of a current coding unit. For example, the size of a transformation unit corresponding to the transformation index may vary according to a prediction unit type or a partition type of a coding unit.

If the decoder 26 may split a current coding unit and then determine the current transformation units having the same size, the size of the current transformation unit may be determined based on the transformation index and a prediction unit type or a partition type of the current coding unit. Also, if a current coding unit is split into transformation units having various sizes according to a tree structure, a size of a current transformation unit may be determined based on the transformation index and a prediction unit type or a partition type of the current coding unit.

The decoder 26 may determine transformation units obtained according to a tree structure, based on transformation index information according to a second exemplary embodiment. For example, a bitstring of the transformation index information according to the second exemplary embodiment may be a bitstring obtained by arranging transformation unit split bits for transformation units of each level. The decoder 26 may determine transformation units into which the current coding unit is split according to a tree structure, by reading the bitstring of the transformation index information according to the second exemplary embodiment and splitting the current coding unit so that independent splitting is performed between transformation units on the same level and that repetitive splitting is performed between levels.

At this time, the decoder 26 may read transformation unit split bits of the transformation units on the same level from the transformation index information according to the second exemplary embodiment and may split transformation units on an upper level into transformation units on a lower level in a zigzag scan sequence. When a transformation unit of an upper level is split into transformation units of a lower level, the decoder 26 may read the transformation unit split bits of the transformation units of the lower level, which are included in the transformation unit of the upper level, in a zigzag scan sequence.

The inverse transformation performed for video decoding by the decoder 26 may be referred to as a process of transforming data of a transformation domain into data of a spatial domain. Examples of the inverse transformation performed by the decoder 26 may include frequency inverse-transformation, orthogonal inverse-transformation, integer inverse-transformation, and the like.

The video encoding apparatus 10 and the video decoding apparatus 20 may efficiently encode and decode information used to determine various sizes and shapes of transformation units having a tree structure, which are necessary for performing transformation and inverse transformation during video encoding and decoding based on various sizes and shapes of coding units, by using the transformation index according to an exemplary embodiment.

Figure 3:
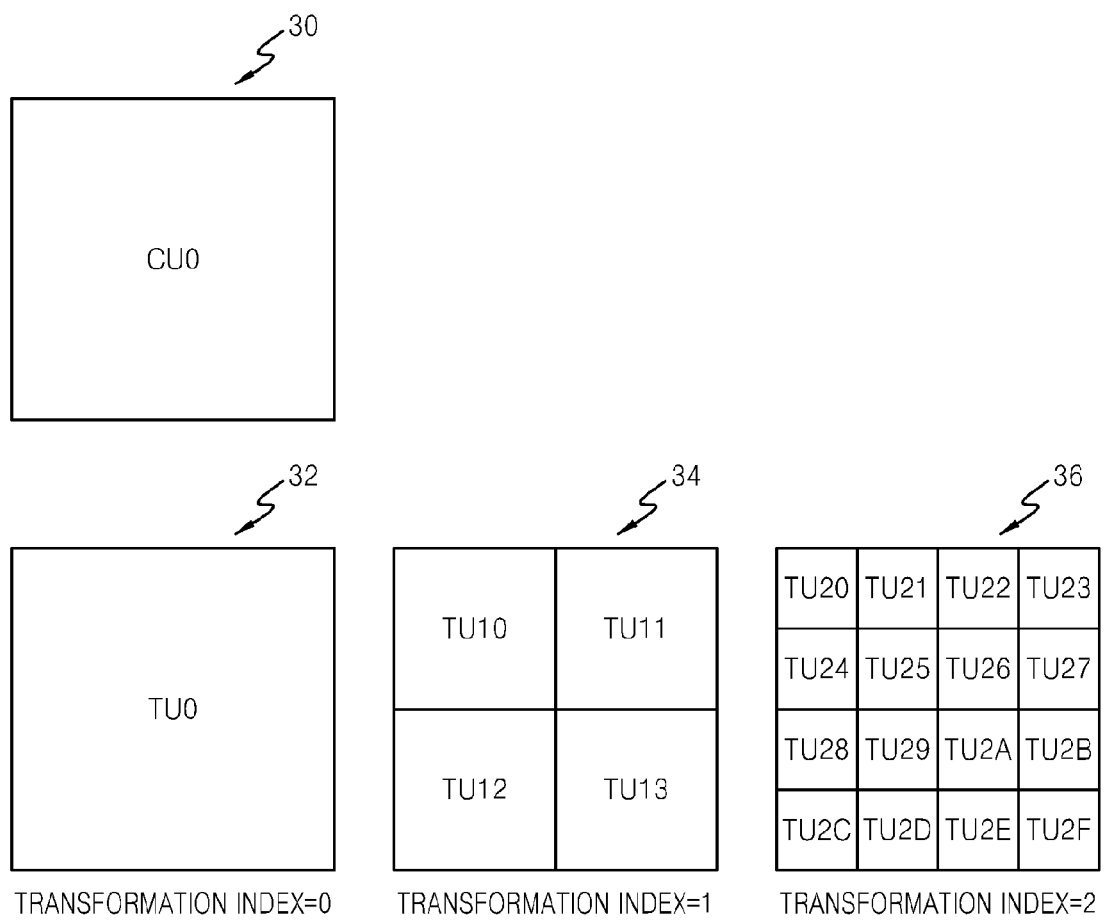
FIG. 3 is a diagram illustrating the structure of a transformation unit and a transformation index, according to an exemplary embodiment.

FIG. 3 is a diagram illustrating the structure of a transformation unit and a transformation index, according to a first exemplary embodiment.

A transformation unit group 32 of level 0, a transformation unit group 34 of level 1, and a transformation unit group 36 of level 2 are illustrated according to a transformation index, as the transformation unit structure according to the first embodiment that includes transformation units of the same sizes in order to transform a coding unit CU0 30. The transformation index according to the first exemplary embodiment may represent the number of times the coding unit CU0 30 is split to turn into a transformation unit group of a current level, that is, a level number.

In other words, the transformation unit group 32 of level 0 includes a transformation unit TU0 that has the same size as the coding unit CUO 30 by splitting the height and width of the coding unit CUO 30 zero times. In this case, the transformation index of the transformation unit group 32 of level 0 is 0.

The transformation unit group 34 of level 1 includes transformation units TU10, TU11, TU12, and TU13 each having a height and a width being half of those of the coding unit CUO 30, by splitting the height and width of the coding unit CUO 30 once. In this case, the transformation index of the transformation unit group 34 of level 1 is 1.

The transformation unit group 36 of level 2 includes transformation units TU20, TU21, TU22, TU23, TU24, TU25, TU26, TU27, TU28, TU29, TU2A, TU2B, TU2C, TU2D, TU2E, and TU2F each having a height and size being a quarter of those of the coding unit CUO 30, by splitting the height and width of the coding unit CUO 30 twice. In this case, the transformation index of the transformation unit group 36 of level 2 is 2.

Figure 4:
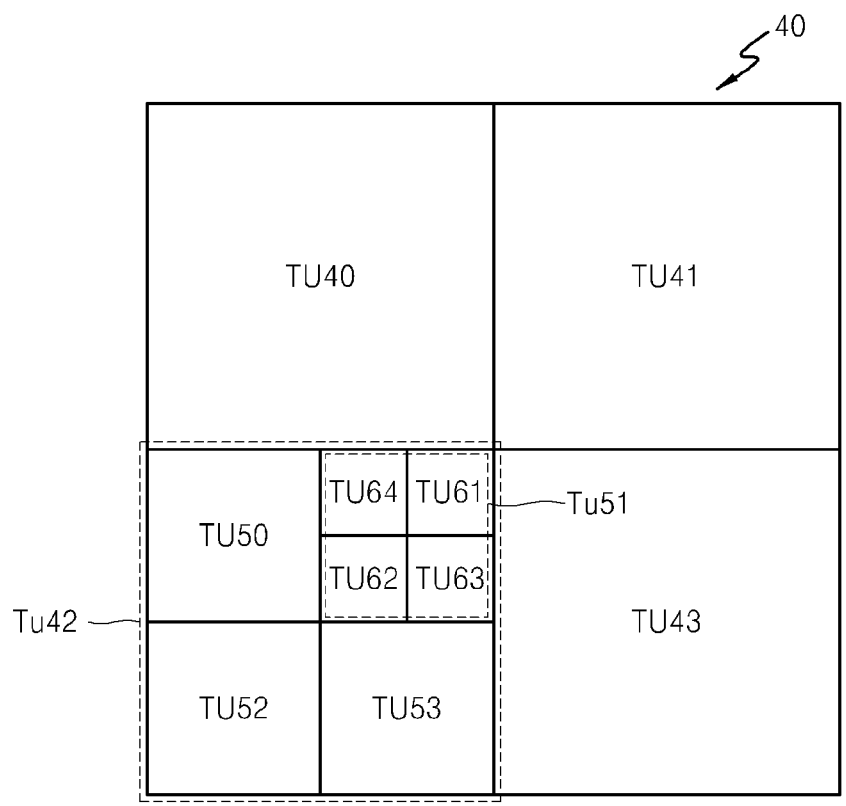
FIG. 4 is a diagram illustrating the structure of a transformation unit and a transformation index, according to an exemplary embodiment.

FIG. 4 is a diagram illustrating the structure of a transformation unit and a transformation index, according to a second exemplary embodiment.

A transformation unit group 40 is illustrated as the transformation unit structure according to the second exemplary embodiment that includes transformation units having a tree structure in order to transform the coding unit CU0 30. The transformation index according to the second exemplary embodiment may be represented as a bitstring of transformation unit split bits for each level that is used until the transformation units having a tree structure are obtained from the coding unit CU0 30.

In other words, since a transformation unit of level 0 having the same size as the coding unit CU0 30 is divided into transformation units TU40, TU41, TU42, and TU43 of level 1, a transformation unit split bit 1 for level 1 may be generated and included in the transformation index. Since transformation unit split bits for transformation units on the same level are arranged in a zigzag scanning sequence, transformation unit split bits for level 0 may be arranged in a sequence of transformation unit split bits for the transformation units TU40, TU41, TU42, and TU43. Since the transformation units TU40 and TU41 are not split, transformation unit split bits 0 and 0 for the transformation units TU40 and TU41 may be sequentially generated and included in the transformation index.

The transformation unit TU42 of level 1 is further split into transformation units TU50, TU51, TU52, and TU53 of level 2. Accordingly, a transformation unit split bit 1 for the transformation unit TU42 of level 1 may be generated. When a transformation unit of a current level is split into transformation units of a lower level, transformation unit split bits for the transformation units of the lower level may be included in the transformation index. Accordingly, a transformation unit split bit 0 for the transformation unit TU50 of level 2, a transformation unit split bit 1 for the transformation unit TU51 of level 2, a transformation unit split bit 0 for the transformation unit TU52 of level 2, and a transformation unit split bit 0 for the transformation unit TU53 of level 2 may be sequentially included in the transformation index. The transformation unit TU51 of level 2 is further split into transformation units TU60, TU61, TU62, and TU63 of level 3. A transformation unit of level 3 is a minimum transformation unit or a minimum unit, and the transformation unit of level 3 is not further split.

In other words, if a transformation unit split bit for a transformation unit of a current level is 1 and transformation units of a lower level are not the minimum transformation unit or the minimum unit, transformation unit split bits for the transformation units of the lower level may be consecutively arranged after the transformation unit split bit for the transformation unit of the current level.

Lastly, since the transformation unit TU43 of level 1 is not split, the transformation unit split bit 0 may be included in the transformation index.

Accordingly, the transformation index according to the second exemplary embodiment for the coding unit CU0 30 may be determined to be 1, 0, 0, 1, 0, 1, 0, 0, 0. If transformation unit split bits for transformation units of a lower level are consecutively 0, it may be understood that the transformation units of the lower level are not further split.

The transformation unit split bits generated in this way are arranged, starting from the transformation unit of level 0 having the same size as the coding unit, in such a way that transformation unit split bits of transformation units on the same level are arranged in a zigzag scanning sequence and that if a transformation unit of a predetermined level is split into transformation units of a lower level having a hierarchical structure, transformation unit split bits for the transformation units of the lower level are arranged in a zigzag scanning sequence, whereby the transformation index according to the second exemplary embodiment may be determined.

Figure 5:
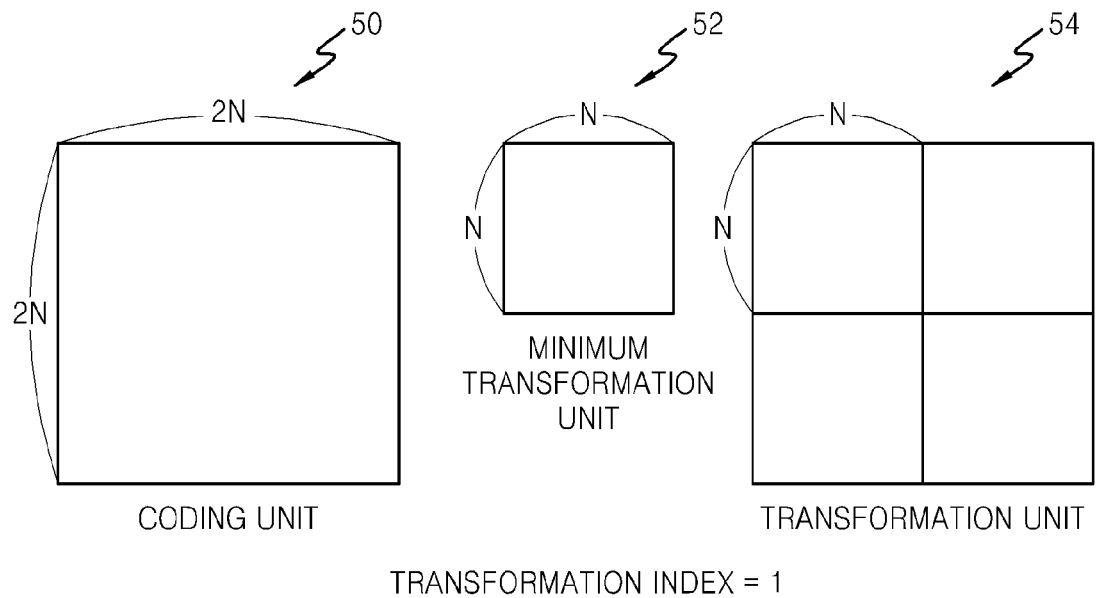
FIGS. 5 and 6 are diagrams illustrating examples of use of the transformation index according to an exemplary embodiment.
Figure 6:
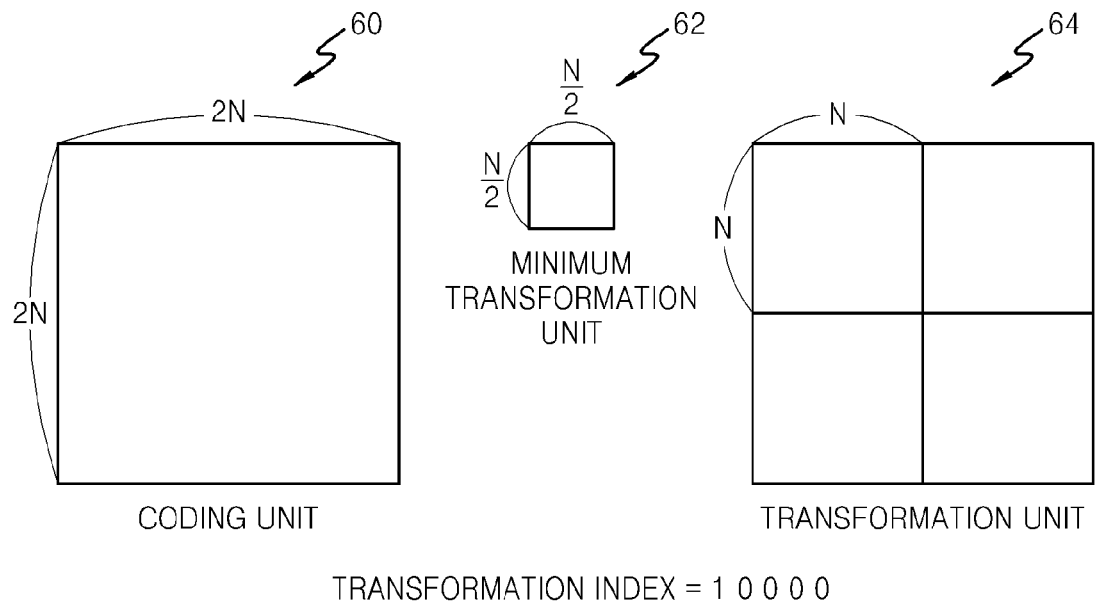

FIGS. 5 and 6 are diagrams illustrating examples of use of the transformation index according to the second exemplary embodiment.

As described above with reference to FIG. 4, if a transformation unit is not further split, transformation unit split bits are not further generated. Thus, the transformation index according to the second exemplary embodiment may be set according to the size of the minimum transformation unit or the minimum unit.

When a minimum transformation unit 52 of a coding unit 50 of a 2N×2N size has a size of N×N, the coding unit 50 may be only split until N×N transformation units are obtained, and thus a transformation index of the coding unit 50 for a transformation unit group 54 may be set to be 1.

On the other hand, when a minimum transformation unit 62 of a coding unit 60 of a 2N×2N size has a size of (N/2)×(N/2), transformation units of a N×N size in a transformation unit group 64 may be each split one more time. Accordingly, a transformation index of the coding unit 60 for the transformation unit group 64 may include, not only a transformation unit split bit 1 for a transformation unit of level 0, but also transformation unit split bits 0, 0, 0, and 0 for the transformation units of level 1 in the transformation unit group 64.

The transformation units described above with reference to FIGS. 3 through 6 may be determined by the transformation unit determiner 12 of the video encoding apparatus 10, and the transformation index may be encoded by the encoded data output unit 14. The extractor 24 of the video decoding apparatus 20 may extract transformation index information, and the decoder 26 thereof may form a transformation unit by reading the transformation index, and perform inverse transformation on the transformation unit.

Figure 7:
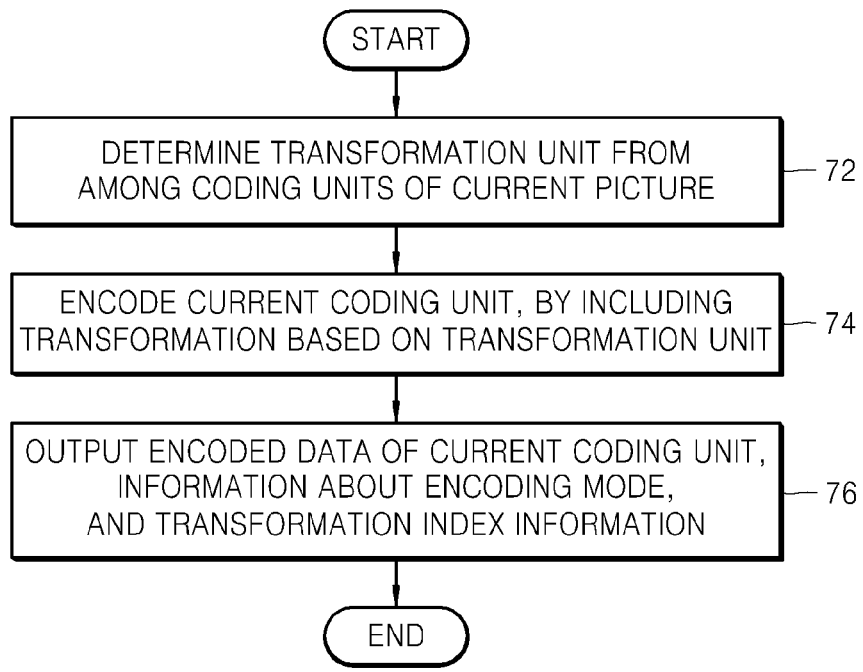
FIG. 7 is a flowchart illustrating a video encoding method using a transformation index, according to an exemplary embodiment.

FIG. 7 is a flowchart illustrating a video encoding method using a transformation index, according to an exemplary embodiment.

In operation 72, a transformation unit, that is, a data unit in which a current coding unit from among coding units of a current picture is transformed, is determined. The transformation unit may be determined to be a data unit having a size smaller than or equal to the current coding unit so that the transformation unit is included in the current coding unit, and the transformation unit may be generated by halving the height and width of the coding unit. Since the transformation unit may form a hierarchical structure, transformation units of a lower level may be generated by halving the height and width of a transformation unit of an upper level. For example, all transformation units of a predetermined level within a current coding unit may be split into transformation units of a lower level, so that as many transformation units of the same size as the number of 4 to the power of a positive integer may be generated.

The transformation unit may include final transformation units whose transformation results are determined to be output, from among the transformation units of the current coding unit.

The hierarchical structure of transformation units according to an exemplary embodiment may be a tree structure. While the height and width of a current transformation unit from among the transformation units of the current coding unit are repeatedly halved, it is determined whether the halving is performed independently from the other transformation units, and thus transformation units of a lower level are generated. The transformation units on each level within the same region may form a hierarchical structure. Final transformation units are determined from among the transformation units generated in this way so that transformation results are output, so that transformation units having a tree structure according to an exemplary embodiment may be obtained.

Transformation units of a level where an error, due to transformation for each transformation unit, is minimized may be selected as the final transformation units whose transformation results are output, by repeatedly performing transformation on each level for transformation units having a hierarchical structure in the current coding unit and comparing the results of the transformations with each other.

In operation 74, the current coding unit is encoded, including transformation based on the transformation unit. In operation 76, encoded data of the current coding unit, information about an encoding mode, and transformation index information are output.

The transformation index information about the structure of a transformation unit according to an exemplary embodiment may indicate whether a current transformation unit is split into transformation units of a lower level. The transformation index information about the structure of a transformation unit according to an exemplary embodiment may include the number of times the current coding unit is split to turn into transformation units of a final level, and information about the sizes and shapes of the transformation units.

Transformation index information according to a first exemplary embodiment may indicate a level that identifies the total number of splitting times from a current coding unit to a coding unit of a final level. The transformation units of each level may have the same sizes.

Transformation index information according to a second exemplary embodiment may indicate whether the current coding unit is repeatedly split to obtain transformation units having a tree structure. The transformation index information according to the second exemplary embodiment may be in the shape of a bitstring obtained by arranging transformation unit split bits that indicate whether a transformation unit of each level is split into transformation units of a lower level. The bitstring of the transformation index information may be obtained by arranging transformation unit split bits of adjacent transformation units of the same level in a sequence where the transformation units are scanned in a zigzag manner. When a current transformation unit includes transformation units of a lower level having a hierarchical structure, a bitstring of the transformation index information may be determined so that transformation unit split bits of the transformation units of a lower level are arranged in a sequence where the transformation units are scanned in a zigzag manner.

Figure 8:
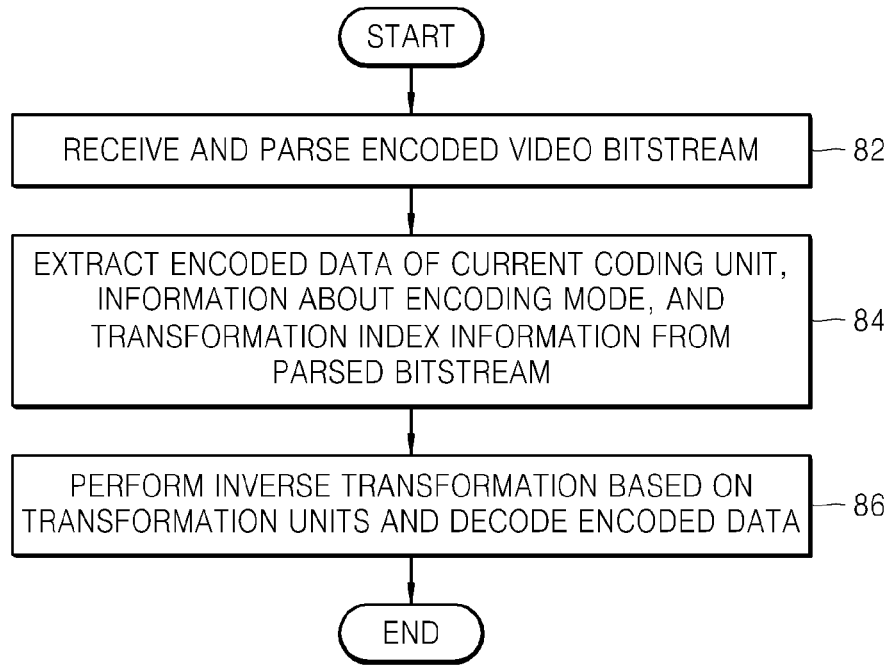
FIG. 8 is a flowchart illustrating a video decoding method using a transformation index, according to an exemplary embodiment.

FIG. 8 is a flowchart illustrating a video decoding method using a transformation index, according to an exemplary embodiment.

In operation 82, a bitstream for an encoded video is received and parsed.

In operation 84, encoded data of a current coding unit of a current picture, information about an encoding mode, and transformation index information are extracted from the parsed bitstream.

In operation 86, inverse transformation is performed on the current coding unit, based on transformation units obtained according to the transformation index information, and thus the encoded data is decoded. As a result of the decoding of each coding unit, the current picture may be restored. Whether a current transformation unit is split into transformation units of a lower level may be read based on the transformation index information about the structure of a transformation unit according to an exemplary embodiment, and the transformation units may be determined. The inverse transformation on the current coding unit may be performed based on the transformation units.

The number of times the current coding unit is split until transformation units of a final level is obtained, and information about the sizes, shapes, and the like, of the transformation units may be read from the transformation index information about the structure of a transformation unit according to an exemplary embodiment.

A level that indicates the total number of splitting times from the current coding unit to a transformation unit of a final level may be read from the transformation index information according to the first exemplary embodiment. The level of a transformation unit indicates the number of times the current coding unit is split to obtain 4 transformation units each having the same size. Accordingly, a structure of transformation units in which the current coding unit is split into transformation units each having the same size may be determined.

A bitstring of transformation unit split bits that indicates whether a transformation unit of each level is split into transformation units of a lower level is read from the transformation index information according to the second exemplary embodiment, until the current coding unit is repeatedly split to obtain transformation units having the tree structure. Thus, a structure of transformation units into which the current coding unit is split according to the tree structure may be determined For example, transformation unit split bits of adjacent transformation units on the same level, from among the transformation index information according to the second exemplary embodiment, may be read in a sequence where the transformation units are scanned in a zigzag manner. Moreover, transformation unit split bits of transformation units of a lower level having a hierarchical structure included in a transformation unit of a predetermined level, from among transformation index information according to another exemplary embodiment, may be read in a sequence where the transformation units of the lower level are scanned in a zigzag manner.

First, a method and apparatus for encoding video by using a coding unit having a tree structure and a transformation index, and a method and apparatus for decoding video by using a coding unit having a tree structure and a transformation index, according to an exemplary embodiment will be described with reference to FIGS. 9 to 23.

Figure 9:
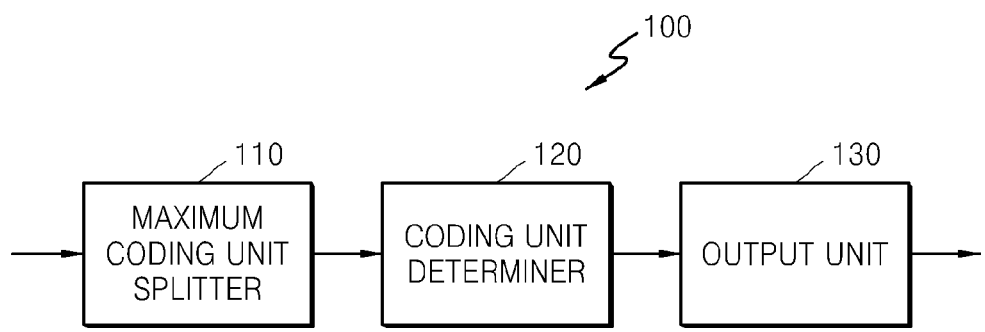
FIG. 9 is a block diagram of a video encoding apparatus using coding units having a tree structure and a transformation index, according to an exemplary embodiment.

FIG. 9 is a block diagram of a video encoding apparatus 100, which uses a transformation index on the basis of coding units and transformation units having a tree structure, according to an exemplary embodiment.

The video encoding apparatus 100, which uses the transformation index based on coding units and transmission units having a tree structure, includes a maximum coding unit splitter 110, a coding unit determiner 120, and an output unit 130. For convenience of explanation, the video encoding apparatus 100, which uses the transformation index based on coding units and transmission units having a tree structure, is referred to as a video encoding apparatus 100.

The maximum coding unit splitter 110 may split a current picture based on a maximum coding unit for the current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and height in squares of 2. The image data may be output to the coding unit determiner 120 according to the at least one maximum coding unit.

A coding unit according to an exemplary embodiment may be characterized by a maximum size and a depth. The depth denotes a number of times the coding unit is spatially split from the maximum coding unit, and as the depth deepens or increases, deeper encoding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. Thus, the encoded image data of the coding unit corresponding to the determined coded depth is finally output. Also, the coding units corresponding to the coded depth may be regarded as encoded coding units.

The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to same depth in one maximum coding unit, it is determined whether to split each of the coding units corresponding to the same depth to a lower depth by measuring an encoding error of the image data of the each coding unit, separately. Accordingly, even when image data is included in one maximum coding unit, the image data is split to regions according to the depths and the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 may determine coding units having a tree structure included in the maximum coding unit. The 'coding units having a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splits from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, 5 depth levels of depths 0, 1, 2, 3 and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit. Transformation may be performed according to method of orthogonal transformation or integer transformation.

Since the number of deeper coding units increases whenever the maximum coding unit is split according to depths, encoding including the prediction encoding and the transformation is performed on all of the deeper coding units generated as the depth deepens. For convenience of description, the prediction encoding and the transformation will now be described based on a coding unit of a current depth, in a maximum coding unit.

The video encoding apparatus 100 may variably select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit to perform the prediction encoding on the image data in the coding unit.

In order to perform prediction encoding in the maximum coding unit, the prediction encoding may be performed based on a coding unit corresponding to a coded depth, i.e., based on a coding unit that is no longer split to coding units corresponding to a lower depth. Hereinafter, the coding unit that is no longer split and becomes a basis unit for prediction encoding will be referred to as a 'prediction unit'. A partition obtained by splitting the prediction unit may include a prediction unit or a data unit obtained by splitting at least one of a height and a width of the prediction unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 may also perform the transformation on the image data in a coding unit based not only on the coding unit for encoding the image data, but also based on a data unit that is different from the coding unit.

As described above with reference to FIGS. 1 through 8, in order to perform the transformation in the coding unit, the transformation may be performed based on a data unit having a size smaller than or equal to the coding unit. For example, the data unit for the transformation may include a data unit for an intra mode and a data unit for an inter mode.

A data unit used as a base of the transformation will be referred to as a 'transformation unit'. A transformation depth that indicates the number of splits to reach the transformation unit by splitting the height and width of the coding unit may also be set in the transformation unit. For example, in a current coding unit of 2N×2N, a transformation depth may be 0 when the size of a transformation unit is also 2N×2N, may be 1 when each of the height and width of the current coding unit is split into two equal parts, totally split into $4^1$ transformation units, and the size of the transformation unit is thus N×N, and may be 2 when each of the height and width of the current coding unit is split into four equal parts, totally split into $4^2$ transformation units and the size of the transformation unit is thus N/2×N/2. For example, the transformation unit may be set according to a hierarchical tree structure, in which a transformation unit of an upper transformation depth is split into four transformation units of a lower transformation depth according to the hierarchical characteristics of a transformation depth.

Similar to the coding unit, the transformation unit in the coding unit may be recursively split into smaller sized regions, so that the transformation unit may be determined independently in units of regions. Thus, residual data in the coding unit may be divided according to the transformation having the tree structure according to transformation depths.

Encoding information according to coding units corresponding to a coded depth requires not only information about the coded depth, but also about information related to prediction encoding and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and a method of determining a partition, according to exemplary embodiments, will be described in detail later with reference to FIGS. 11 and 12.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depth may include information about the coded depth, about the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, image data in the current coding unit is encoded and output, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit, and information about at least one encoding mode is determined for a coding unit of a coded depth, information about at least one encoding mode may be determined for one maximum coding unit. Also, a coded depth of the image data of the maximum coding unit may be different according to locations since the image data is hierarchically split according to depths, and thus information about the coded depth and the encoding mode may be set for the image data.

Accordingly, the output unit 130 may assign encoding information about a corresponding coded depth and an encoding mode to at least one of the coding unit, the prediction unit, and a minimum unit included in the maximum coding unit.

The minimum unit according to an exemplary embodiment is a rectangular data unit obtained by splitting the minimum coding unit constituting the lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to coding units, and encoding information according to prediction units. The encoding information according to the coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Also, information about a maximum size of the coding unit defined according to pictures, slices, or GOPs, and information about a maximum depth may be inserted into SPS (Sequence Parameter Set) or a header of a bitstream. Furthermore, the encoding information output through the output unit 130 may include transformation index information about a structure of a transformation unit according to an exemplary embodiment, as described above with reference to FIGS. 1 through 8.

In the video encoding apparatus 100, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit of the current depth having the size of 2N×2N may include a maximum of 4 coding units of the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformations, an optimum encoding mode may be determined considering characteristics of the coding unit of various image sizes.

Thus, if an image having high resolution or large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100, image compression efficiency may be increased since a coding unit is adjusted while considering characteristics of an image while increasing a maximum size of a coding unit while considering a size of the image.

Figure 10:
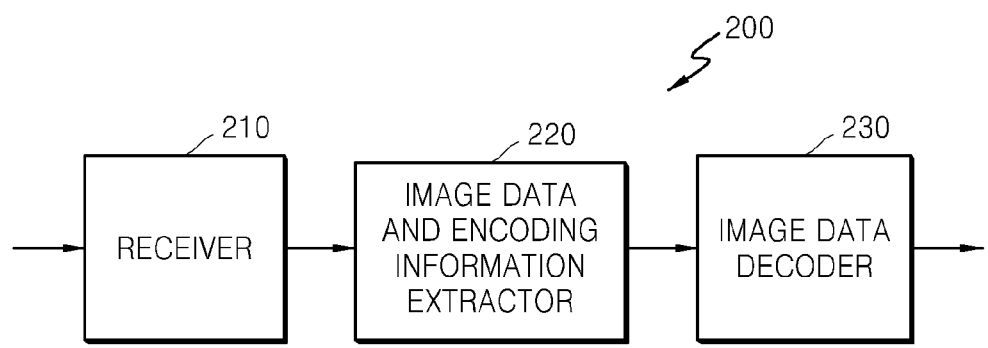
FIG. 10 is a block diagram of a video decoding apparatus using coding units having a tree structure and a transformation index, according to an exemplary embodiment.

FIG. 10 is a block diagram of a video decoding apparatus 200 using coding units having a tree structure and a transformation index, according to an exemplary embodiment.

The video decoding apparatus 200 includes a receiver 210, an image data and encoding information extractor 220, and an image data decoder 230. Various terms, such as a coding unit, a depth, a prediction unit, a transformation unit, and information about various encoding modes, for various operations of the video decoding apparatus 200 are identical to those described with reference to FIG. 9 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture or SPS.

Also, the image data and encoding information extractor 220 extracts information about a coded depth and an encoding mode for the coding units having a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode may include information about a partition type of a corresponding coding unit corresponding to the coded depth, about a prediction mode, and a size of a transformation unit. Also, splitting information according to depths may be extracted as the information about the coded depth. Furthermore, the image data and encoding information extractor 220 may extract transformation index information about a structure of a transformation unit according to an embodiment as described above with reference to FIGS. 1 through 8 as the extracted information about the coded depth and the encoding mode.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to a coded depth and an encoding mode that generates the minimum encoding error.

Since encoding information about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. The predetermined data units to which the same information about the coded depth and the encoding mode is assigned may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation. Inverse transformation may be performed according to method of inverse orthogonal transformation or inverse integer transformation.

The image data decoder 230 may perform intra prediction or motion compensation according to a partition and a prediction mode of each coding unit, based on the information about the partition type and the prediction mode of the prediction unit of the coding unit according to coded depths.

Also, the image data decoder 230 may perform inverse transformation according to each transformation unit in the coding unit, based on the information about the size of the transformation unit of the coding unit according to coded depths, to perform the inverse transformation according to maximum coding units.

The image data decoder 230 may determine at least one coded depth of a current maximum coding unit by using split information according to depths. If the split information indicates that image data is no longer split in the current depth, the current depth is a coded depth. Accordingly, the image data decoder 230 may decode encoded data of at least one coding unit corresponding to the each coded depth in the current maximum coding unit by using the information about the partition type of the prediction unit, the prediction mode, and the size of the transformation unit for each coding unit corresponding to the coded depth, and output the image data of the current maximum coding unit.

In other words, data units containing the encoding information that indicates the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 may obtain information about at least one coding unit that generates the minimum encoding error when encoding is recursively performed for each maximum coding unit, and may use the information to decode the current picture. In other words, the coding units having the tree structure determined to be the optimum coding units in each maximum coding unit may be decoded. Also, the maximum size of coding unit is determined considering resolution and an amount of image data.

Accordingly, even if image data has high resolution and a large amount of data, the image data may be efficiently decoded and restored by using a size of a coding unit and an encoding mode, which are adaptively determined according to characteristics of the image data, by using information about an optimum encoding mode received from an encoder.

A method of determining coding units having a tree structure, a prediction unit, and a transformation unit, according to an exemplary embodiment, will now be described with reference to FIGS. 11 through 21.

Figure 11:
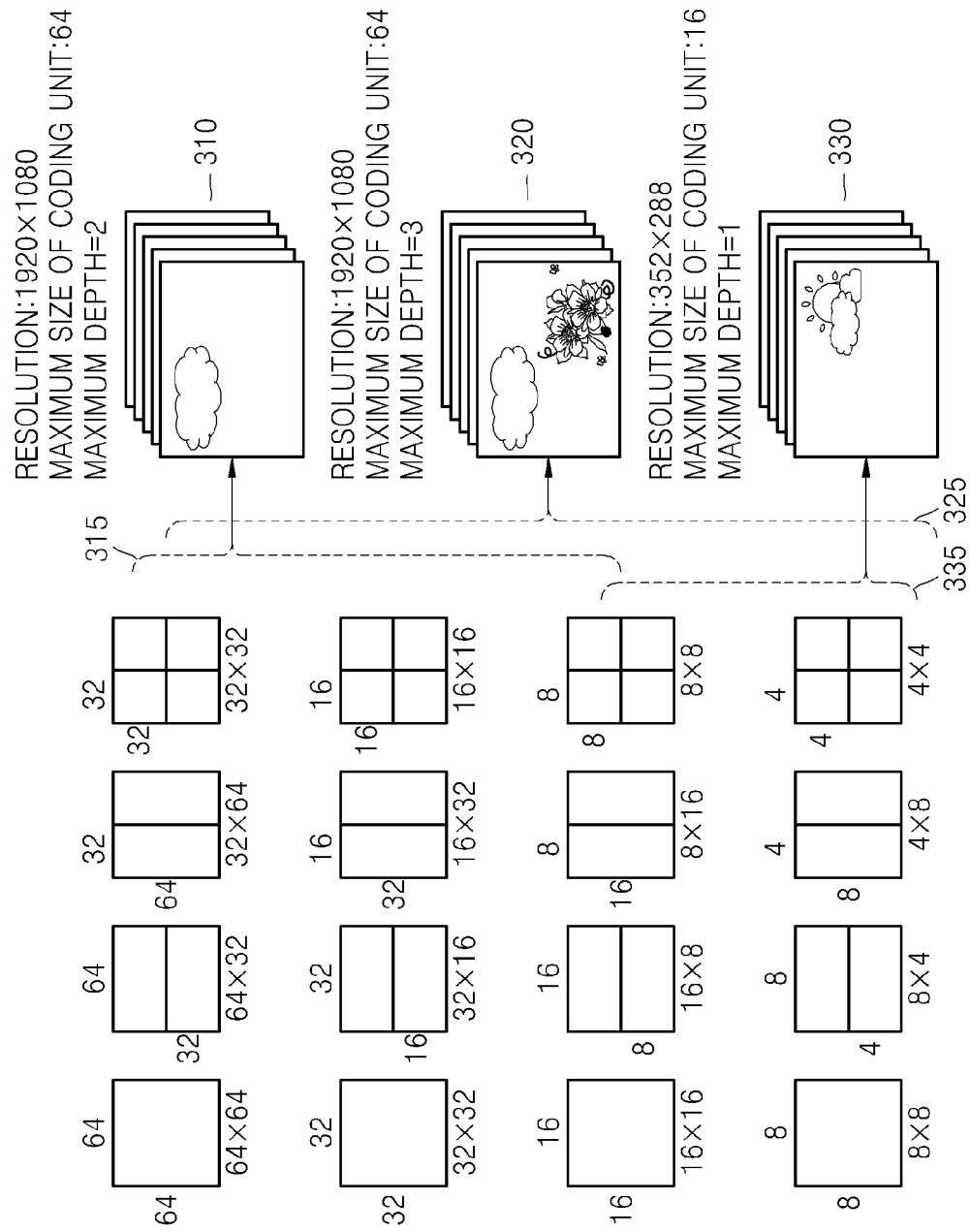
FIG. 11 is a diagram for describing a concept of coding units according to an exemplary embodiment.

FIG. 11 is a diagram for describing a concept of hierarchical coding units according to an exemplary embodiment.

A size of a coding unit may be expressed in width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 11 denotes a total number of splits from a maximum coding unit to a minimum decoding unit.

If a resolution is high or a data amount is large, a maximum size of a coding unit may be large to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are deepened to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 12:
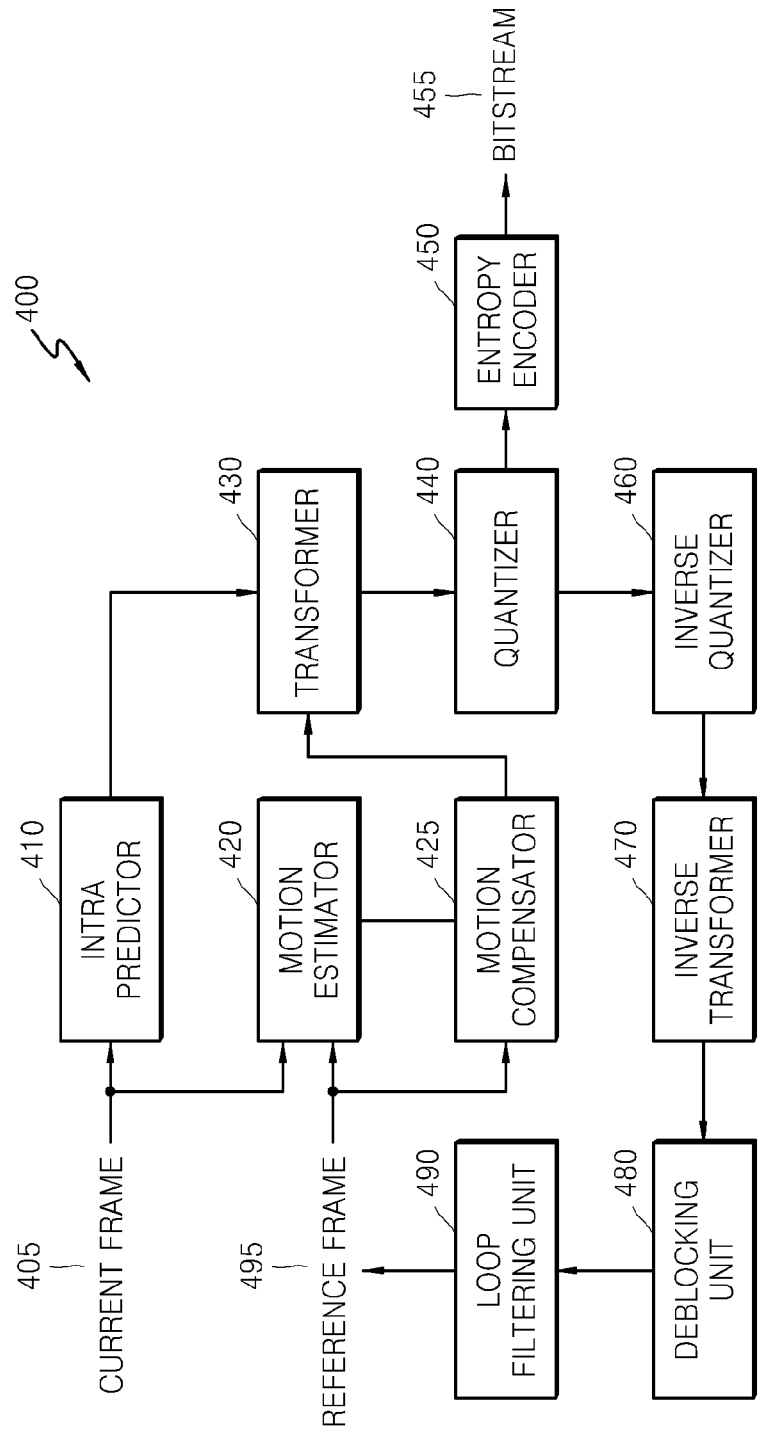
FIG. 12 is a block diagram of an image encoder based on coding units according to an exemplary embodiment.

FIG. 12 is a block diagram of an image encoder 400 based on coding units, according to an exemplary embodiment.

The image encoder 400 performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 performs inter estimation and motion compensation on coding units in an inter mode from among the current frame 405 by using the current frame 405, and a reference frame 495.

Data output from the intra predictor 410, the motion estimator 420, and the motion compensator 425 is output as a quantized transformation coefficient through a transformer 430 and a quantizer 440. The quantized transformation coefficient is restored as data in a spatial domain through an inverse quantizer 460 and an inverse transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied in the video encoding apparatus 100, all elements of the image encoder 400, i.e., the intra predictor 410, the motion estimator 420, the motion compensator 425, the transformer 430, the quantizer 440, the entropy encoder 450, the inverse quantizer 460, the inverse transformer 470, the deblocking unit 480, and the loop filtering unit 490 perform operations based on each coding unit from among coding units having a tree structure while considering the maximum depth of each maximum coding unit.

Specifically, the intra predictor 410, the motion estimator 420, and the motion compensator 425 determines partitions and a prediction mode of each coding unit from among the coding units having a tree structure while considering the maximum size and the maximum depth of a current maximum coding unit, and the transformer 430 determines the size of the transformation unit in each coding unit from among the coding units having a tree structure.

Figure 13:
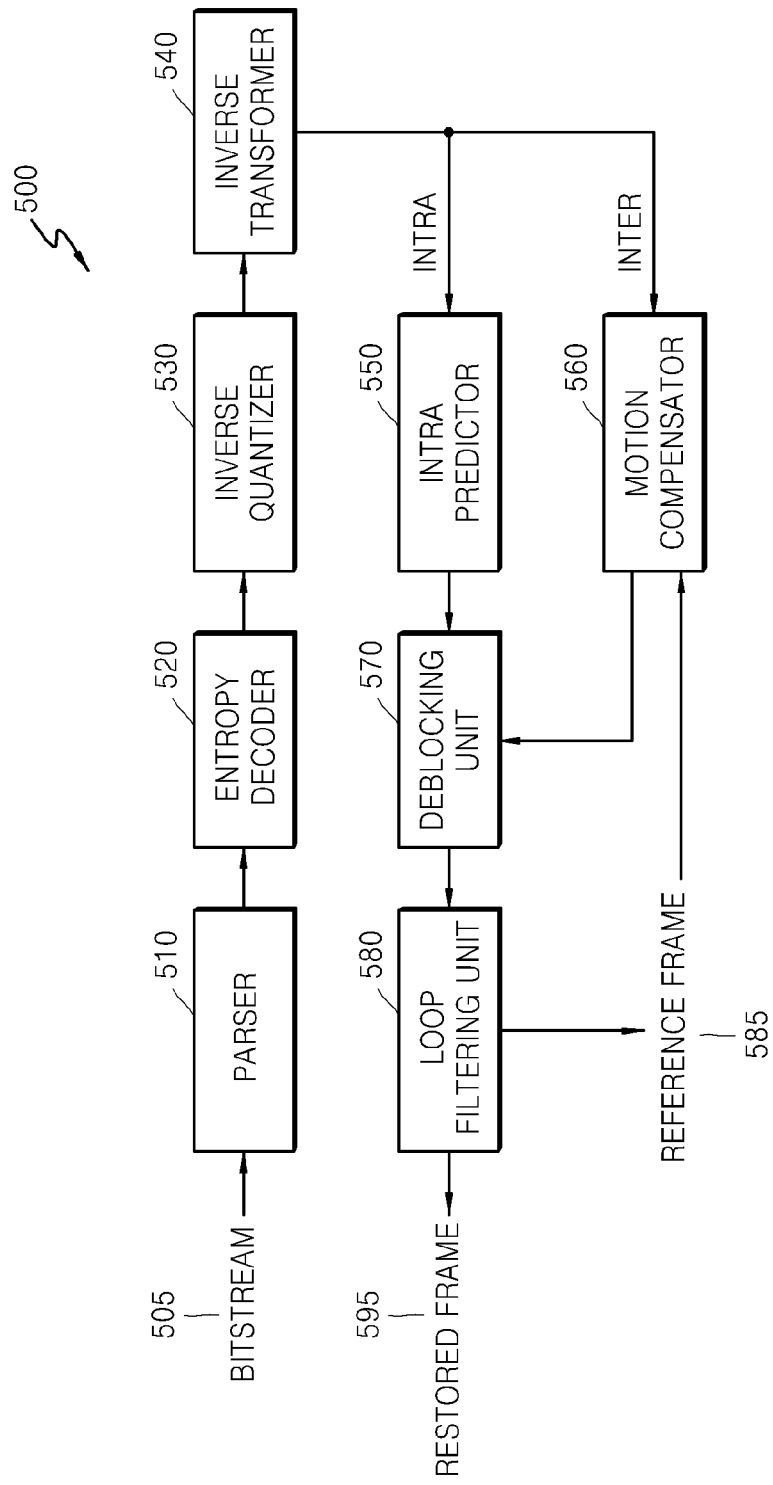
FIG. 13 is a block diagram of an image decoder based on coding units according to an exemplary embodiment.

FIG. 13 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530, and the inverse quantized data is restored to image data in a spatial domain through an inverse transformer 540.

An intra predictor 550 performs intra prediction on coding units in an intra mode with respect to the image data in the spatial domain, and a motion compensator 560 performs motion compensation on coding units in an inter mode by using a reference frame 585.

The image data in the spatial domain, which passed through the intra predictor 550 and the motion compensator 560, may be output as a restored frame 595 after being post-processed through a deblocking unit 570 and a loop filtering unit 580. Also, the image data that is post-processed through the deblocking unit 570 and the loop filtering unit 580 may be output as the reference frame 585.

In order to decode the image data in the image data decoder 230 of the video decoding apparatus 200, the image decoder 500 may perform operations that are performed after the parser 510.

In order for the image decoder 500 to be applied in the video decoding apparatus 200, all elements of the image decoder 500, i.e., the parser 510, the entropy decoder 520, the inverse quantizer 530, the inverse transformer 540, the intra predictor 550, the motion compensator 560, the deblocking unit 570, and the loop filtering unit 580 perform operations based on coding units having a tree structure for each maximum coding unit.

Specifically, the intra predictor 550 and the motion compensator 560 perform operations based on partitions and a prediction mode for each of the coding units having a tree structure, and the inverse transformer 540 perform operations based on a size of a transformation unit for each coding unit.

Figure 14:
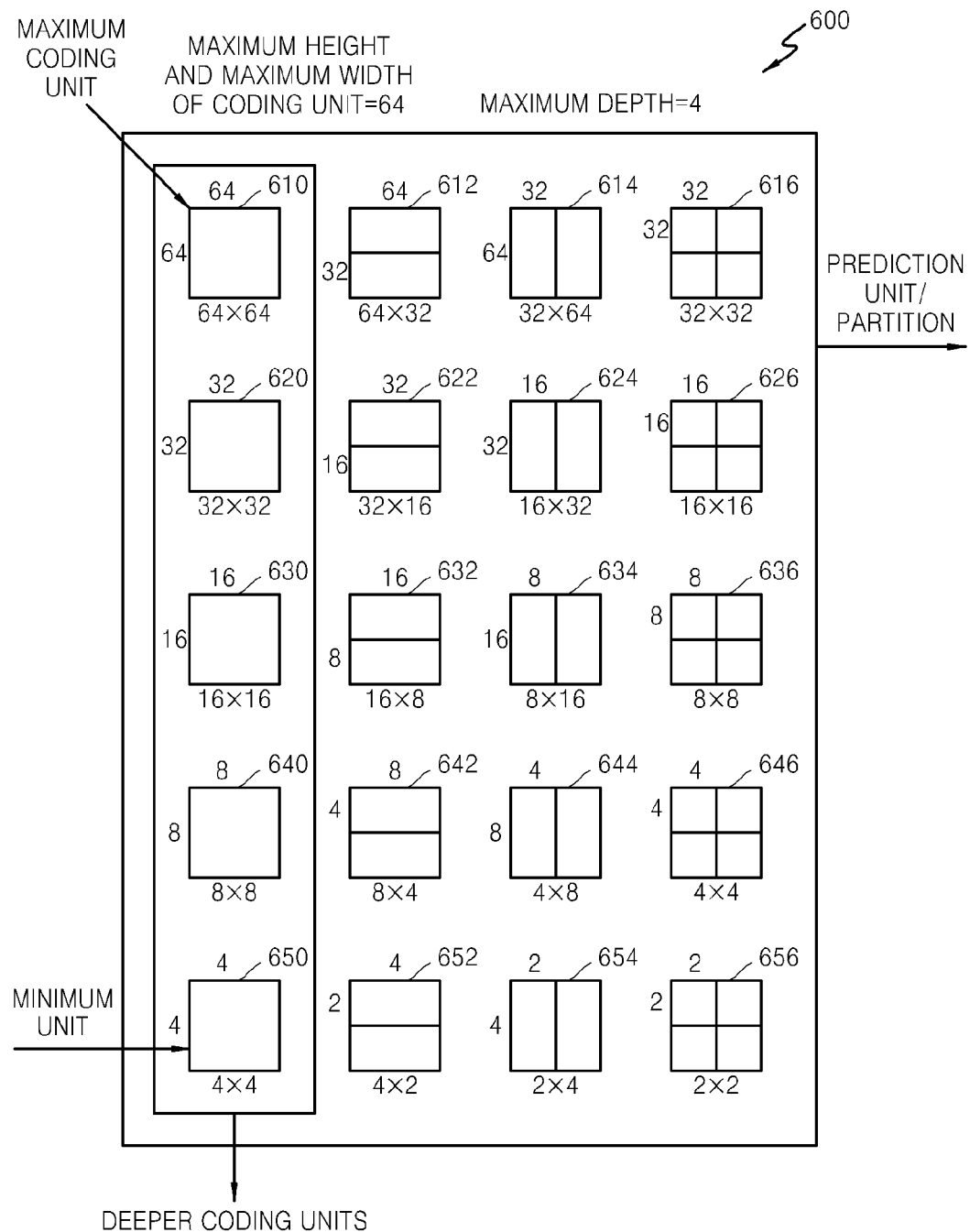
FIG. 14 is a diagram illustrating deeper coding units according to depths, and partitions according to an exemplary embodiment.

FIG. 14 is a diagram illustrating deeper coding units according to depths, and partitions, according to an exemplary embodiment.

The video encoding apparatus 100 and the video decoding apparatus 200 use hierarchical coding units to consider characteristics of an image. A maximum height, a maximum width, and a maximum depth of coding units may be adaptively determined according to the characteristics of the image, or may be individually set according to an input of a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 4. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e., a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

The coding unit 650 having the size of 4×4 and the depth of 4 is the minimum coding unit and a coding unit of the lowermost depth. A prediction unit of the coding unit 650 is only assigned to a partition having a size of 4×4. Also, a prediction unit of the coding unit 650 may be split into partitions 652 having a size of 4×2, partitions 654 having a size of 2×4, and partitions 656 having a size of 2×2.

In order to determine the at least one coded depth of the coding units constituting the maximum coding unit 610, the coding unit determiner 120 of the video encoding apparatus 100 performs encoding for coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 15:
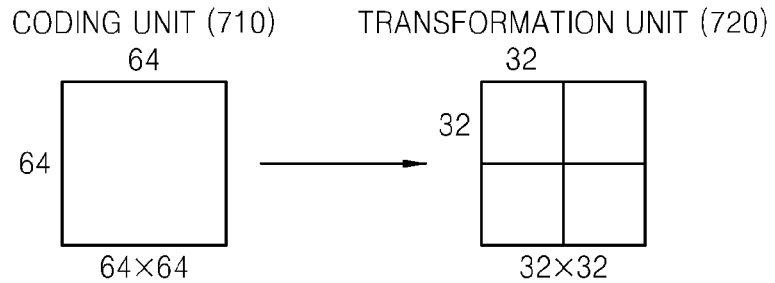
FIG. 15 is a diagram for describing a relationship between a coding unit and transformation units, according to an exemplary embodiment.

FIG. 15 is a diagram for describing a relationship between a coding unit 710 and transformation units 720, according to an exemplary embodiment.

The video encoding apparatus 100 or 200 encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 or 200, if a size of the coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error may be selected.

Figure 16:
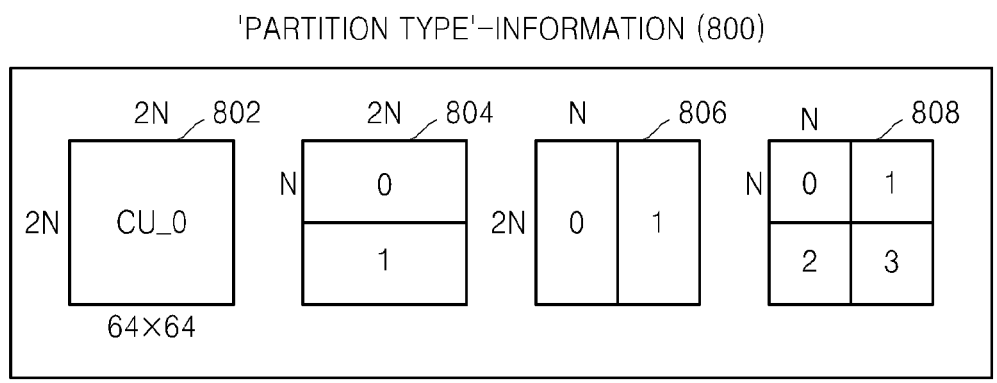
FIG. 16 is a diagram for describing encoding information of coding units corresponding to a coded depth, according to an exemplary embodiment.
Figure 16:
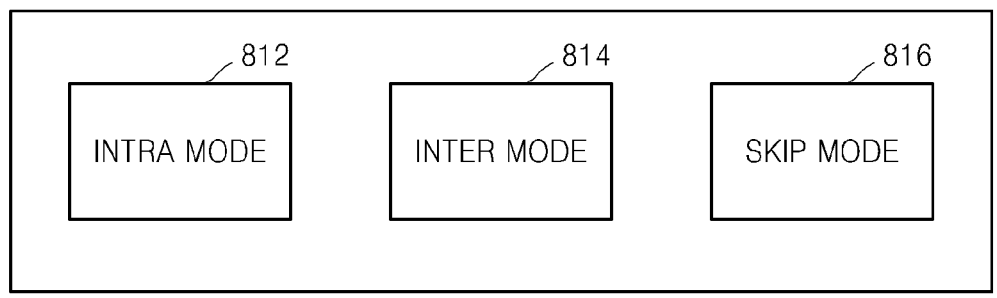
Figure 16:
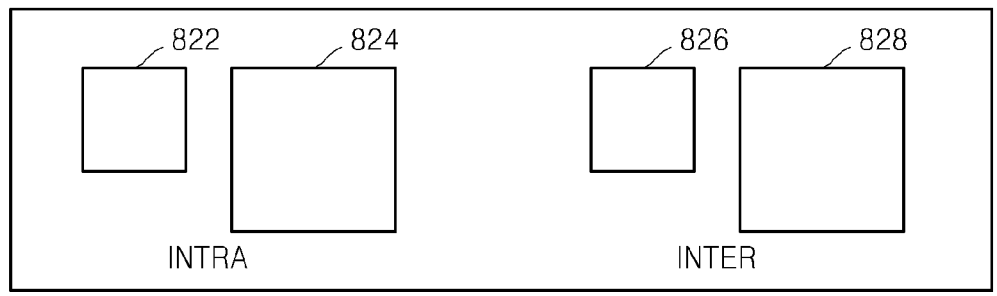

FIG. 16 is a diagram for describing encoding information of coding units corresponding to a coded depth, according to an exemplary embodiment.

The output unit 130 of the video encoding apparatus 100 may encode and transmit information 800 about a partition type, information 810 about a prediction mode, and information 820 about a size of a transformation unit for each coding unit corresponding to a coded depth, as information about an encoding mode.

The information 800 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about a partition type is set to indicate one of the partition 804 having a size of 2N×N, the partition 806 having a size of N×2N, and the partition 808 having a size of N×N The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second intra transformation unit 828. Also, the encoding information may include transformation index information about a structure of a transformation unit according.

The image data and encoding information extractor 220 of the video decoding apparatus 200 may extract and use the information 800, 810, and 820 for decoding, according to each deeper coding unit.

Figure 17:
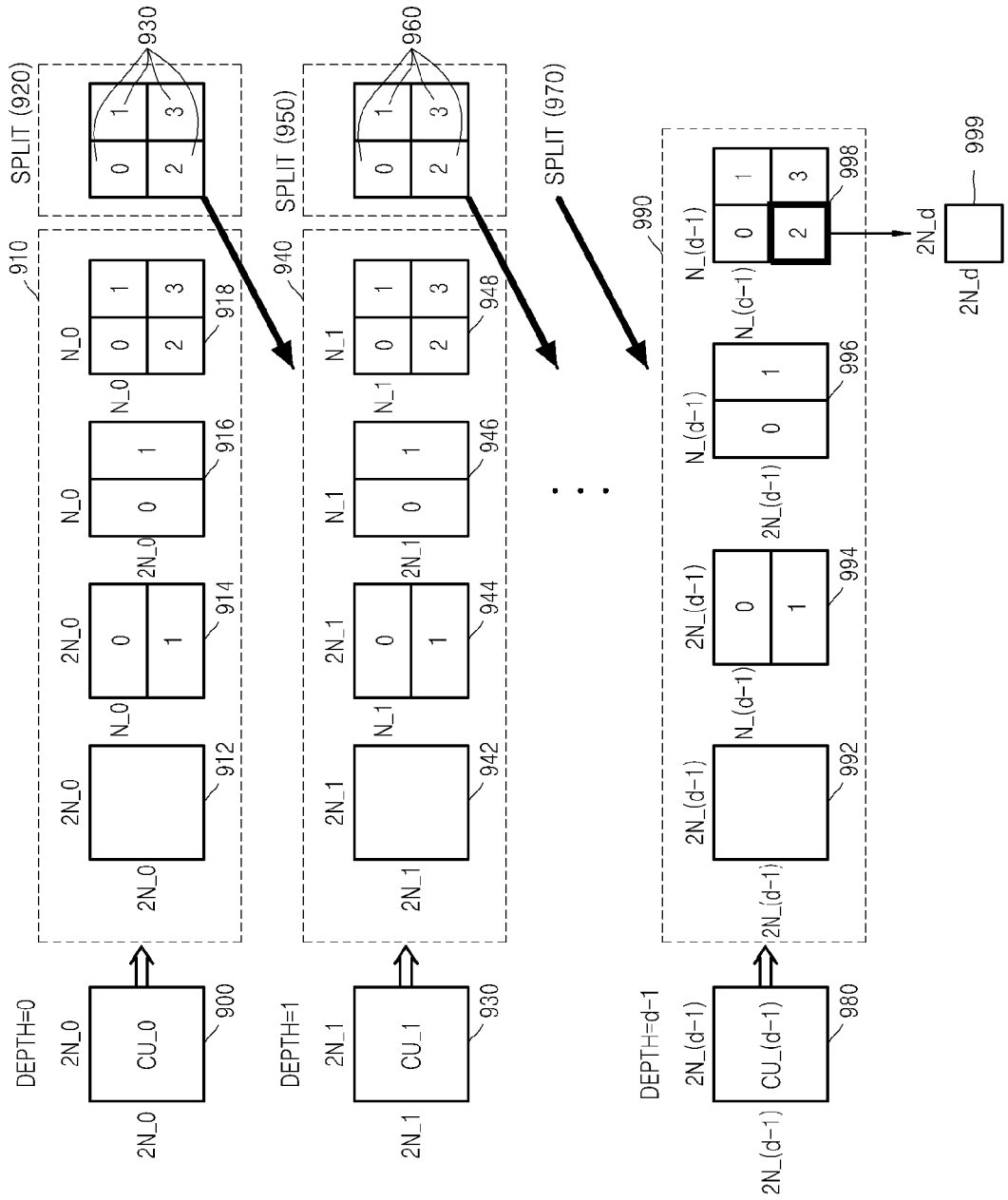
FIG. 17 is a diagram of deeper coding units according to depths, according to an exemplary embodiment.

FIG. 17 is a diagram of deeper coding units according to depths, according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N 0×N_0, and N_0×N_0. The prediction encoding in a skip mode is performed only on the partition having the size of 2N_0×2N_0.

Errors of encoding including the prediction encoding in the partition types 912 through 918 are compared, and the least encoding error is determined among the partition types. If an encoding error is smallest in one of the partition types 912 through 916, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0× N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, split operation according to each depth may be performed up to when a depth becomes d−1, and split information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d-1)×2N_(d-1), two partitions having a size of 2N_(d-1)×N_(d-1), two partitions having a size of N_(d-1)×2N_(d-1), four partitions having a size of N_(d-1)×N_(d-1) from among the partition types 992 through 998 to search for a partition type having a minimum encoding error.

Even when the partition type 998 has the minimum encoding error, since a maximum depth is d, a coding unit CU_(d-1) having a depth of d-1 is no longer split to a lower depth, and a coded depth for the coding units constituting a current maximum coding unit 900 is determined to be d-1 and a partition type of the current maximum coding unit 900 may be determined to be N_(d-1)×N_(d-1). Also, since the maximum depth is d and a minimum coding unit 980 having a lowermost depth of d-1 is no longer split to a lower depth, split information for the minimum coding unit 980 is not set.

A data unit 999 may be a 'minimum unit' for the current maximum coding unit. A minimum unit according to an exemplary embodiment may be a rectangular data unit obtained by splitting a minimum coding unit 980 by 4. By performing the encoding repeatedly, the video encoding apparatus 100 may select a depth having the least encoding error by comparing encoding errors according to depths of the coding unit 900 to determine a coded depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only split information of the coded depth is set to 0, and split information of depths excluding the coded depth is set to 1.

The image data and encoding information extractor 220 of the video decoding apparatus 200 may extract and use the information about the coded depth and the prediction unit of the coding unit 900 to decode the partition 912. The video decoding apparatus 200 may determine a depth, in which split information is 0, as a coded depth by using split information according to depths, and use information about an encoding mode of the corresponding depth for decoding.

Figure 18:
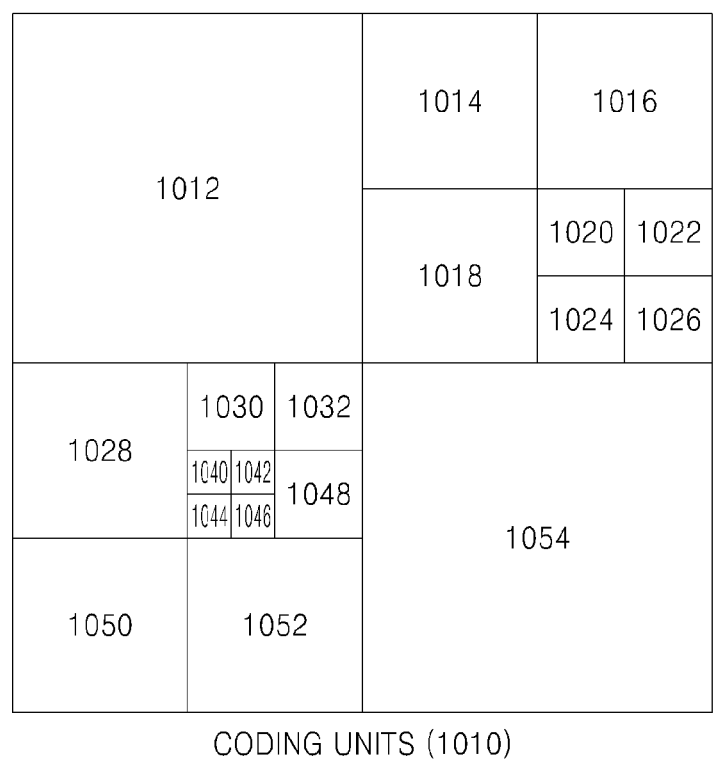
FIGS. 18 through 20 are diagrams for describing a relationship between coding units, prediction units, and transformation units, according to an exemplary embodiment.
Figure 19:
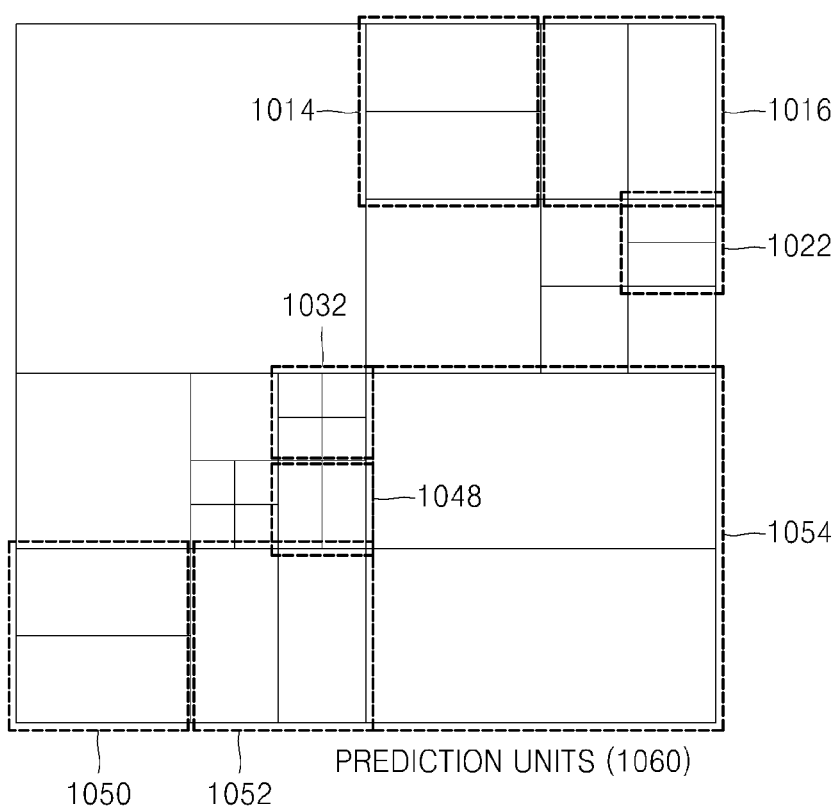
Figure 20:
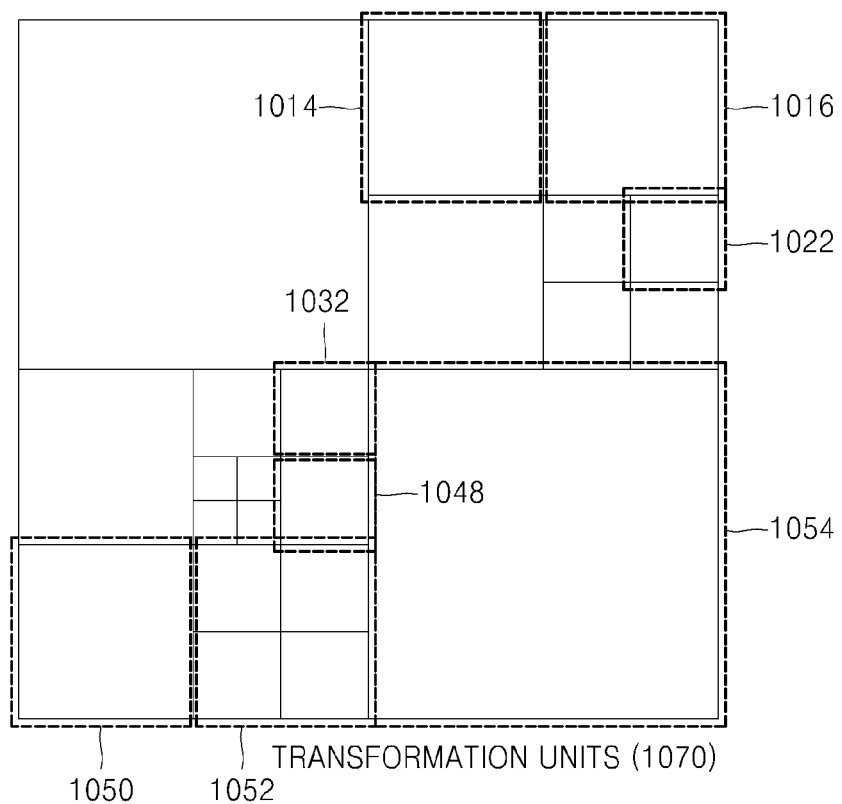

FIGS. 18, 19, and 20 are diagrams for describing a relationship between coding units 1010, prediction units 1060, and transformation units 1070, according to an exemplary embodiment.

The coding units 1010 are coding units having a tree structure, corresponding to coded depths determined by the video encoding apparatus 100, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some encoding units 1014, 1016, 1022, 1032, 1048, 1050, 1052, and 1054 are obtained by splitting the coding units in the encoding units 1010. In other words, partition types in the coding units 1014, 1022, 1050, and 1054 have a size of 2N×N, partition types in the coding units 1016, 1048, and 1052 have a size of N×2N, and a partition type of the coding unit 1032 has a size of N×N. Prediction units and partitions of the coding units 1010 are smaller than or equal to each coding unit.

Transformation or inverse transformation is performed on image data of the coding unit 1052 in the transformation units 1070 in a data unit that is smaller than the coding unit 1052. Also, the coding units 1014, 1016, 1022, 1032, 1048, 1050, and 1052 in the transformation units 1070 are different from those in the prediction units 1060 in terms of sizes and shapes. In other words, the video encoding and decoding apparatuses 100 and 200 may perform intra prediction, motion estimation, motion compensation, transformation, and inverse transformation individually on a data unit in the same coding unit.

Accordingly, encoding is recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding and decoding apparatuses 100 and 200.

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Type) N/2 × N/2 (Asymmetrical Type) | |

The output unit 130 of the video encoding apparatus 100 may output the encoding information about the coding units having a tree structure, and the image data and encoding information extractor 220 of the video decoding apparatus 200 may extract the encoding information about the coding units having a tree structure from a received bitstream.

Split information indicates whether a current coding unit is split into coding units of a lower depth. If split information of a current depth d is 0, a depth, in which a current coding unit is no longer split into a lower depth, is a coded depth, and thus information about a partition type, prediction mode, and a size of a transformation unit may be defined for the coded depth. If the current coding unit is further split according to the split information, encoding is independently performed on four split coding units of a lower depth.

A prediction mode may be one of an intra mode, an inter mode, and a skip mode. The intra mode and the inter mode may be defined in all partition types, and the skip mode is defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD may be respectively obtained by splitting the height of the prediction unit in 1:3 and 3:1, and the asymmetrical partition types having the sizes of nL×2N and nR×2N may be respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit may be 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be N×N, and if the partition type of the current coding unit is an asymmetrical partition type, the size of the transformation unit may be N/2×N/2.

The encoding information about coding units having a tree structure may include at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred for predicting the current coding unit.

Figure 21:
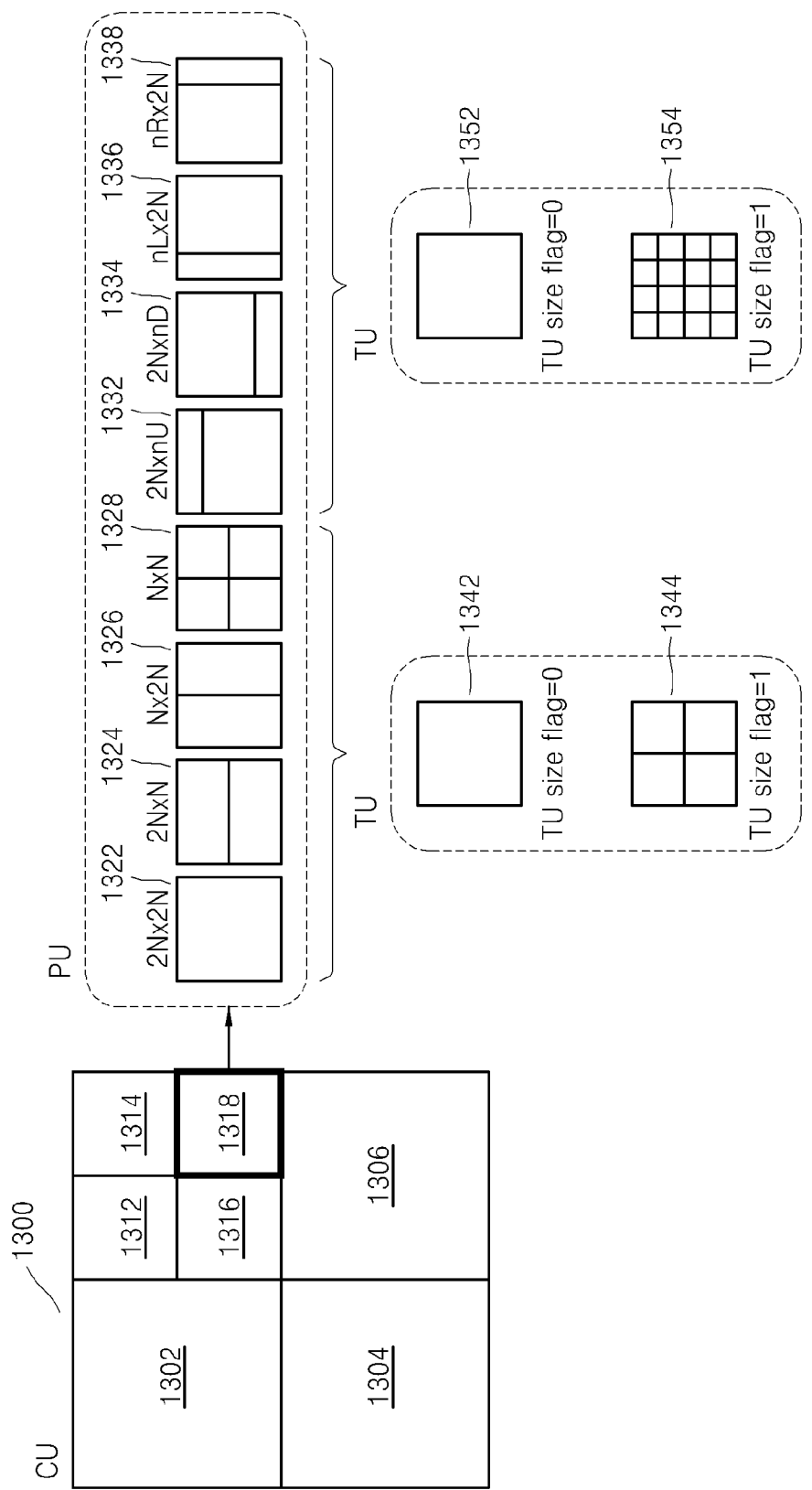
FIG. 21 is a diagram for describing a relationship between a coding unit, a prediction unit or partition, and a transformation unit, according to encoding mode information of Table 1.

FIG. 21 is a diagram for describing a relationship between a coding unit, a prediction unit or a partition, and a transformation unit, according to encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Split information (TU size flag) of a transformation unit is a type of a transformation index, and a current size of a transformation unit may be determined based on the transformation index and a prediction unit type or a partition type of a current coding unit.

For example, when the partition type is set to be symmetrical, i.e. the partition type 1322, 1324, 1326, or 1328, a transformation unit 1342 having a size of 2N×2N is set if a TU size flag is 0, and a transformation unit 1344 having a size of N×N is set if a TU size flag is 1.

On the other hand, when the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Accordingly, the size of a transformation unit corresponding to the transformation index may vary according to a prediction unit type or a partition type of a coding unit.

Referring to FIG. 21, the TU size flag is a flag having a value or 0 or 1, but the TU size flag is not limited to 1 bit, and a transformation unit may be hierarchically split having a tree structure while the TU size flag increases from 0.

In this case, the size of a transformation unit that has been actually used may be expressed by using a TU size flag of a transformation unit, according to an exemplary embodiment, together with a maximum size and minimum size of the transformation unit. According to an exemplary embodiment, the video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. According to an exemplary embodiment, the video decoding apparatus 200 may decode video by using the maximum transformation unit size information, the minimum transformation unit size information, and the maximum TU size flag.

For example, if the size of a current coding unit is 64×64 and a maximum transformation unit size is 32×32, then the size of a transformation unit may be 32×32 when a TU size flag 0, may be 16×16 when the TU size flag is 1, and may be 8×8 when the TU size flag is 2.

As another example, if the size of the current coding unit is 32×32 and a minimum transformation unit size is 32×32, then the size of the transformation unit may be 32×32 when the TU size flag is 0. Here, the TU size flag cannot be set to a value other than 0, since the size of the transformation unit cannot be less than 32×32.

As another example, if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeindex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$\text{CurrMinTuSize} = \max(\text{MinTransformSize}, \text{RootTuSize}/(2^{\text{MaxTransformSizeIndex}})) \quad \text{Equation (1)}$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize=\min(MaxTransformSize, PUSize) \quad \text{Equation (2)}$$

That is, if the current prediction mode is the inter mode, the transformation unit size 'RootTuSize' when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize=\min(MaxTransformSize, PartitionSize) \quad \text{Equation (3)}$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and is not limited thereto.

According to an exemplary embodiment, the current maximum transformation unit size 'RootTuSize' may be equal to the size of the current coding unit. According to other exemplary embodiment, the current maximum transformation unit size 'RootTuSize' may be determined base on a prediction unit type or a partition type of the current prediction unit or partition. For example, the current maximum transformation unit size 'RootTuSize' may indicate the size of a maximum square included in the current prediction unit or partition.

Figure 22:
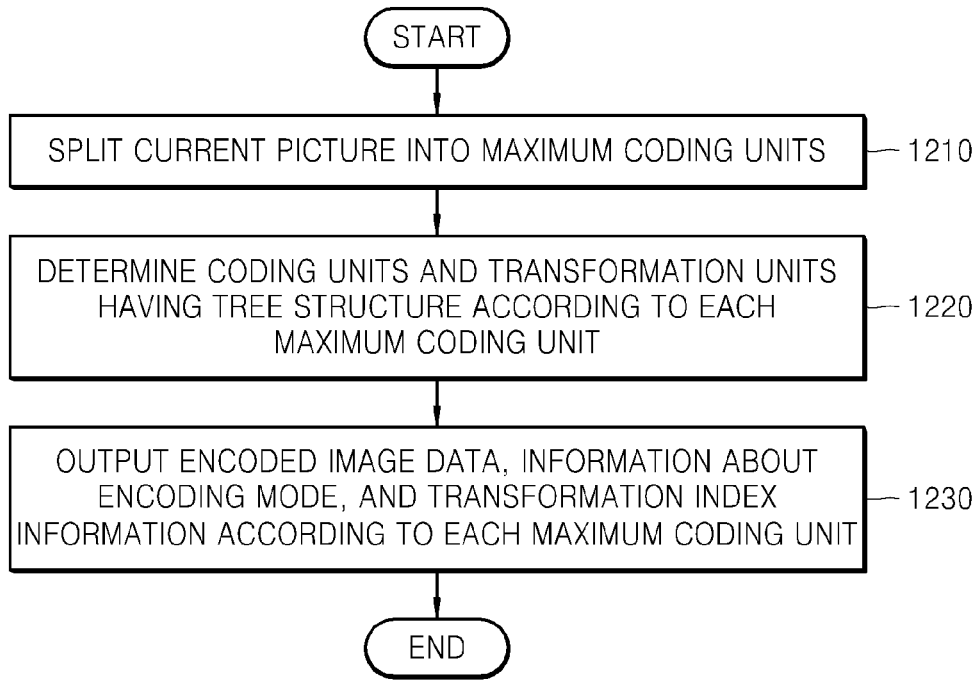
FIG. 22 is a flowchart illustrating a video encoding method that uses a transformation index on the basis of coding units and transformation units having a tree structure, according to an exemplary embodiment.

FIG. 22 is a flowchart illustrating a video encoding method that uses a transformation index on the basis of coding units and transformation units having a tree structure, according to an exemplary embodiment.

In operation 1210, a current picture is split into at least one maximum coding unit. A maximum depth that indicates the total number of possible spits may be predetermined.

In operation 1220, a coded depth to output a final encoding result according to at least one split region, which is obtained by splitting a region of each maximum coding unit according to depths, is determined by encoding the at least one split region, and a coding unit according to a tree structure is determined.

The maximum coding unit is spatially split whenever the depth deepens, and thus is split into coding units of a lower depth. Each coding unit may be split into coding units of another lower depth by being spatially split independently from adjacent coding units. Encoding is repeatedly performed on each coding unit according to depths.

Also, a transformation unit according to partition types having the least encoding error is determined for each deeper coding unit. In order to determine a coded depth having a minimum encoding error in each maximum coding unit, encoding errors may be measured and compared in all deeper coding units according to depths.

In the determination of the coding unit, transformation units, being a data unit in which the coding unit is transformed, may be determined. The transformation units may be determined to be a data unit minimizing an error due to the transformation on the coding unit. The transformation units may be determined to have the same size within a single coding unit. As a result of performing transformation at each level according to a transformation depth within a current coding unit, transformation units based on a tree structure that form a hierarchical structure between transformation units on the same region according to transformation depths and are independent from transformation units on the other region may be determined.

In operation 1230, encoded image data constituting the final encoding result according to the coded depth is output for each maximum coding unit, with encoding information about the coded depth and an encoding mode. The information about the encoding mode may include information that indicates a coded depth or split information, information that indicates a partition type of a prediction unit, information that indicates a prediction mode, information that indicates a size of a transformation unit, and a transformation index. The encoded information about the encoding mode may be transmitted to a decoder with the encoded image data.

Figure 23:
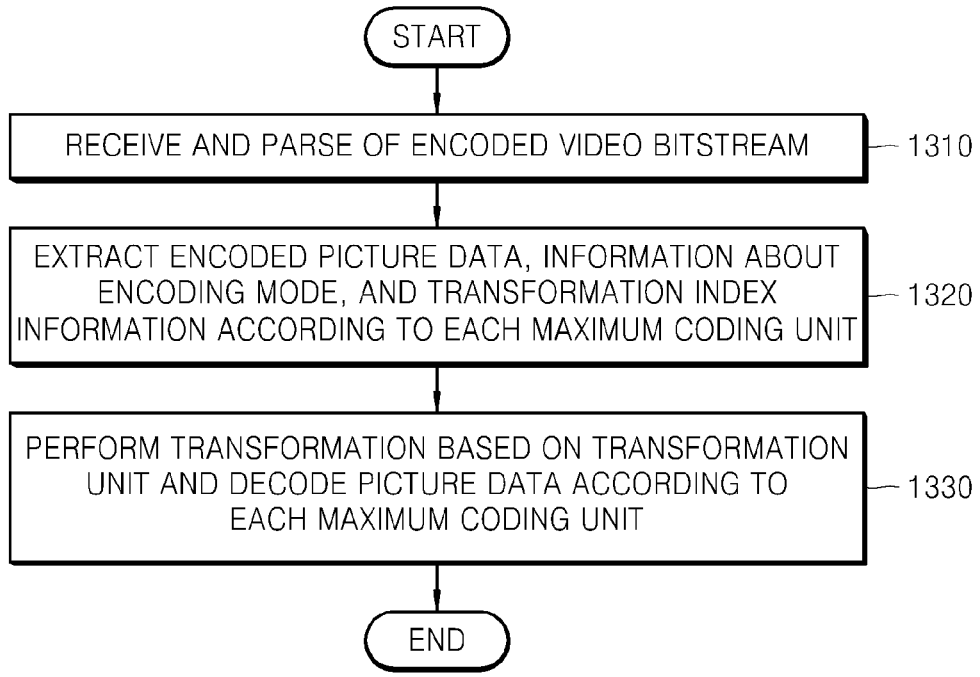
FIG. 23 is a flowchart illustrating a video decoding method that use a transformation index on the basis of the coding units and the transformation units having a tree structure, according to an exemplary embodiment.

FIG. 23 is a flowchart illustrating a video decoding method that use a transformation index on the basis of the coding units and the transformation units having a tree structure, according to an exemplary embodiment.

In operation 1310, a bitstream of an encoded video is received and parsed.

In operation 1320, encoded image data of a current picture assigned to a maximum coding unit, and information about a coded depth and an encoding mode according to maximum coding units are extracted from the parsed bitstream. The coded depth of each maximum coding unit is a depth having the least encoding error in each maximum coding unit. In encoding each maximum coding unit, the image data is encoded based on at least one data unit obtained by hierarchically splitting the each maximum coding unit according to depths.

According to the information that indicates the coded depth and the encoding mode, the maximum coding unit may be split into coding units having a tree structure. Each of the coding units having the tree structure is determined as a coding unit corresponding to a coded depth, and is optimally encoded as to output the least encoding error. Accordingly, encoding and decoding efficiency of an image may be improved by decoding each piece of encoded image data in the coding units after determining at least one coded depth according to coding units.

According to the transformation index included in the information about the encoding mode, transformation units having a tree structure within a coding unit may be determined. For example, the number of splits from the current coding unit to a transformation unit may be read from the transformation index. In another embodiment, it may be determined whether the current coding unit is split into transformation units of a lower level, and thus a structure of transformation units having a tree structure may be finally read from a bitstring that indicates whether splitting from the uppermost transformation unit to a lower transformation unit is performed for each region of the current coding unit.

In operation 1330, the image data of each maximum coding unit is decoded based on the information about the coded depth and the encoding mode according to the maximum coding units. The decoded image data may be reproduced by a reproducing apparatus, stored in a storage medium, or transmitted through a network.

The exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs). Alternatively, the exemplary embodiments may be embodied as signals computer-readable transmission media, such as data signals, for transmission over a computer network, for example the Internet.

The video encoding apparatuses or video decoding apparatuses of the exemplary embodiments may include a bus coupled to every unit of the apparatus, at least one processor connected to the bus that executes commands, and a memory connected to the bus that stores commands, received messages, and generated messages.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of decoding an encoded video, the method comprising:
   receiving a bitstream of the encoded video;
   determining at least one coding unit by using split information extracted from the bitstream;
   extracting from the bitstream transformation index information indicating whether a transformation unit of a current level included in a coding unit among the at least one coding unit is split;
   when the transformation index information indicates a split of the transformation unit of the current level, splitting the transformation unit of the current level into transformation units of a lower level; and
   when the transformation index information indicates a non-split of the transformation unit of the current level, performing an inverse transformation on the transformation unit of the current level to generate residual data corresponding to the transformation unit of the current level,
   wherein the transformation unit of the current level is split into four square transformation units of the lower level by halving a height and a width of the transformation unit of the current level.

2. The video decoding method of claim 1, wherein the transformation unit of the current level is included in the coding unit, and a size of the transformation unit of the current level is smaller than or equal to a size of the coding unit.

3. The video decoding method of claim 2, wherein the transformation unit of the current level is obtained by halving a height and a width of the coding unit.

4. The video decoding method of claim 1, wherein the coding unit is a data unit in which a picture of the encoded video is encoded and the transformation unit of the current level is a data unit in which the data of the coding unit is transformed.

* * * * *